United States Patent
Kumazawa et al.

(10) Patent No.: US 9,045,631 B2
(45) Date of Patent: *Jun. 2, 2015

(54) THERMOPLASTIC RESIN COMPOSITION

(75) Inventors: Sadanori Kumazawa, Nagoya (JP); Hiroyuki Ohme, Nagoya (JP); Yuki Amano, Nagoya (JP); Takamasa Owaki, Nagoya (JP)

(73) Assignee: Toray Industries, Inc. (JP)

(*) Notice: Subject to any disclaimer, the term of this patent is extended or adjusted under 35 U.S.C. 154(b) by 114 days.

This patent is subject to a terminal disclaimer.

(21) Appl. No.: 13/359,632

(22) Filed: Jan. 27, 2012

(65) Prior Publication Data

US 2012/0149837 A1    Jun. 14, 2012

Related U.S. Application Data

(62) Division of application No. 12/306,761, filed as application No. PCT/JP2007/062842 on Jun. 27, 2007, now Pat. No. 8,193,264.

(30) Foreign Application Priority Data

Jun. 30, 2006 (JP) ................... 2006-181429

(51) Int. Cl.

| C08L 67/00 | (2006.01) |
|---|---|
| C08K 5/06 | (2006.01) |
| C08L 69/00 | (2006.01) |
| C08K 3/00 | (2006.01) |
| C08K 5/04 | (2006.01) |
| H01H 33/662 | (2006.01) |

(52) U.S. Cl.
CPC . *C08L 67/00* (2013.01); *C08K 5/06* (2013.01); *C08K 3/0033* (2013.01); *C08K 5/04* (2013.01); *C08L 69/00* (2013.01); *H01H 2033/6623* (2013.01)

(58) Field of Classification Search
CPC ........... C08K 5/06; C08L 59/00; C08L 67/00; C08L 69/00; C08L 77/00
USPC .................. 524/243, 245, 368, 386; 525/385; 528/486
See application file for complete search history.

(56) References Cited

U.S. PATENT DOCUMENTS

| 2,893,966 | A |   | 7/1959 | Greenlee |   |
|---|---|---|---|---|---|
| 2,927,918 | A |   | 3/1960 | Anderson |   |
| 3,100,157 | A |   | 8/1963 | Shroeder et al. |   |
| 3,272,769 | A |   | 9/1966 | Hunyar |   |
| 3,361,702 | A | * | 1/1968 | Wartman et al. | 524/377 |
| 3,632,632 | A |   | 1/1972 | Hauser et al. |   |
| 4,128,525 | A | * | 12/1978 | Yeakey et al. | 524/602 |
| 4,473,679 | A |   | 9/1984 | Falk et al. |   |
| 4,524,191 | A |   | 6/1985 | Nakamura et al. |   |
| 4,828,619 | A | * | 5/1989 | Matsushita et al. | 106/661 |
| 5,429,590 | A |   | 7/1995 | Saito et al. |   |
| 6,231,970 | B1 |   | 5/2001 | Andersen et al. |   |
| 6,875,841 | B2 | * | 4/2005 | Sakanoue et al. | 528/425 |
| 8,193,264 | B2 | * | 6/2012 | Kumazawa et al. | 524/243 |
| 2001/0039312 | A1 | * | 11/2001 | Evans et al. | 525/190 |
| 2005/0226917 | A1 |   | 10/2005 | Burton |   |
| 2007/0203261 | A1 |   | 8/2007 | Narayan et al. |   |

FOREIGN PATENT DOCUMENTS

| EP | 0 682 057 A1 | 11/1995 |
|---|---|---|
| JP | 59-142240 | 8/1984 |
| JP | 64-079256 | 3/1989 |
| JP | 05-098141 A | 4/1993 |
| JP | 7-304970 | 11/1995 |
| JP | 8-59931 A | 5/1996 |
| JP | 09-176464 A | 7/1997 |
| JP | 9-208794 A | 8/1997 |
| JP | 10-60240 | 3/1998 |
| JP | 2000-119493 A | 4/2000 |
| JP | 2001-200038 | 7/2001 |
| JP | 2002-275337 | 9/2002 |
| JP | 2003-292752 | 10/2003 |
| JP | 2005-112933 | 4/2005 |
| WO | 03/085046 A1 | 10/2003 |

* cited by examiner

*Primary Examiner* — Tae H Yoon
(74) *Attorney, Agent, or Firm* — DLA Piper LLP (US)

(57) ABSTRACT

A thermoplastic resin composition obtained by mixing 100 parts by weight of at least one thermoplastic resin (A) with 0.1 to 4 parts by weight of (B) a polyfunctional compound having three or more functional groups in which at least one of the terminal structures having the functional groups is a structure represented by formula (1):

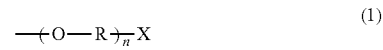

(1)

where R is an alkylene group with 1-15 carbon atoms; n is an integer of 1 to 10; and X is at least one functional group selected from the group consisting of hydroxyl group, aldehyde group, carboxyl group, sulfo group, amino group, isocyanate group, carbodiimide group, oxazoline group, oxazine group, amide group, silanol group and silyl ether group.

6 Claims, 3 Drawing Sheets

Distance to be measured (b)

(a)

(b)

THERMOPLASTIC RESIN COMPOSITION

RELATED APPLICATIONS

This application is a divisional of U.S. patent application Ser. No. 12/306,761 filed Dec. 29, 2008, now U.S. Pat. No. 8,193,264, which is a 371 of PCT/JP2007/062842 filed Jun. 27, 2007, which claims priority to Japanese Application No. 2006-181429 filed Jun. 30, 2006, the contents of which are incorporated herein in its entirety.

TECHNICAL FIELD

This disclosure relates to a thermoplastic resin composition comprising a thermoplastic resin and a specific compound having three or more functional groups and also to a molded article thereof, respectively excellent in flowability and mechanical properties, hence useful as electric/electronic apparatus parts, automobile parts, mechanical parts, etc., and, in a preferred mode, further excellent in low warping property, laser transmittance and laser weldability.

BACKGROUND

Thermoplastic resins such as polyester resins, polycarbonate resins and polyamide resins are widely used as various containers, films, electric/electronic parts, etc. owing to their excellent mechanical properties, heat resistance, moldability and recyclability. Among them, polybutylene terephthalate, polypropylene terephthalate and polyethylene terephthalate as polyester resins are widely used as materials to be molded into industrial articles such as connectors, relays and switches of automobiles and electric/electronic apparatuses, since they are also high in the reinforcing effect by an inorganic filler and excellent in chemicals resistance.

However, in recent years, there are growing demands for smaller and lighter-weight industrial moldings, and especially polybutylene terephthalate used for automobiles and electric/electronic apparatuses is requested to be enhanced in the flowability during melting without lowering its mechanical properties in view of these demands.

JP 2001-200038 A (claims) describes a polyester resin with a melt tension of 0.8 to 5.0 g containing a trivalent or higher polyvalent carboxylic acid or a polyhydric alcohol, but the obtained polyester resin has a problem that the viscosity increases to lower the flowability.

Further, JP 7-304970 A (claims) describes a method for enhancing the flowability by melt-mixing a combination consisting of a specific thermoplastic resin and a specific compound having at least three functional groups, but the flowability enhancing effect is insufficient while the mechanical properties also tend to decline.

Furthermore, JP 10-60240 A (claims) describes that a polyester resin composition consisting of polybutylene terephthalate resin, styrene-based resin and inorganic filler is excellent in low warping property and mechanical properties. However, this polyester resin composition has a problem that since the flowability is low, it cannot respond to the demands for smaller and lighter-weight industrial moldings in recent years.

On the other hand, in the conventional situation where more complicated shapes are being employed for products, respective parts are bonded to each other by an adhesive or mechanically bonded by bolts, etc. However, the use of an adhesive has a problem concerned with adhesive strength, and the mechanical bonding by use of bolts, etc. have such problems as cost, inefficient tightening work and weight increase. Hot plate welding has a problem of stringing, and vibration welding and ultrasonic welding require the disposal of the burrs formed near the joints. On the other hand, in the laser welding of molded resin parts, the overlapped resin parts are irradiated with a laser beam in such a manner that the laser beam is transmitted through one resin part, while the other resin part absorbs the laser beam, to be molten for fusion bonding. This technique has such advantages as three-dimensional bonding possibility, contactless processing and no burring, and is being rapidly employed in wider fields owing to these advantages.

Meanwhile, polyester resins, especially polybutylene terephthalate-based resins are very low in laser beam transmittance compared with thermoplastic resins such as nylon resins, and in the case where the laser welding technique is applied with a polybutylene terephthalate-based resin as the molded resin part through which the laser beam is transmitted, the thickness control is severe since the laser beam transmittance is low. Therefore, the molded resin part must be thinned for enhancing the laser beam transmittance, and the degree of freedom in product design is very low.

JP 2003-292752 A (claims) describes a case in which polybutylene terephthalate resin or a polybutylene terephthalate-based resin consisting of polybutylene terephthalate and a polybutylene terephthalate copolymer and one or more resins selected from a polycarbonate resin, acrylonitrile/styrene copolymer, polyphenylene oxide, styrene resin, acrylic resin, polyethersulfone, polyarylate and polyethylene terephthalate are mixed to enhance the laser beam transmittance, for allowing laser welding. WO 2003/085046 (claims) describes a case in which a resin composition consisting of polybutylene terephthalate resin and one or more selected from a polycarbonate-based resin, styrene-based resin and polyethylene terephthalate-based resin can have a higher laser transmittance and can be used for laser welding. In these cases, the laser beam transmittance can be greatly enhanced compared with that of polybutylene terephthalate resin alone, but there are such problems that the flowability is not always sufficiently high and that when the size of the molded article is large, molding cannot be performed.

It could therefore be helpful to provide a thermoplastic resin composition and a molded article thereof, respectively excellent in flowability and mechanical properties, and, in a preferred mode, also excellent in low warping property, laser transmittance and laser weldability.

SUMMARY

We thus provide:
(1) A thermoplastic resin composition obtained by mixing 0.1 to 4 parts by weight of (B) a polyfunctional compound having three or more functional groups, in which at least one of the terminal structures having the functional groups is a structure represented by the following formula (1), with 100 parts by weight of (A) a thermoplastic resin:

Chemical Formula 1

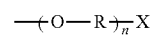
$$-(\!-\!O-\!R-\!)_n X \quad (1)$$

where R denotes a hydrocarbon group with 1 to 15 carbon atoms; n denotes an integer of 1 to 10; and X denotes at least one type of functional group selected from hydroxyl group, aldehyde group, carboxyl group, sulfo group, glycidyl group, amino group, isocyanate group, carbodiimide group, oxazoline group, oxazine group, ester group, amide group, silanol group and silyl ether group.

(2) A thermoplastic resin composition, according to the aforementioned (1), wherein in the formula (1), R denotes an alkylene group; n denotes an integer of 1 to 7; and X denotes at least one type of functional group selected from hydroxyl group, carboxyl group, glycidyl group, amino group, isocyanate group, ester group and amide group.

(3) A thermoplastic resin composition, according to the aforementioned (1) or (2), wherein the (A) thermoplastic resin is one or more selected from a polyester resin and polycarbonate resin.

(4) A thermoplastic resin composition, according to any one of the aforementioned (1) through (3), wherein (C) a terminal blocking agent having less than three functional groups is further mixed.

(5) A thermoplastic resin composition, according to any one of the aforementioned (1) through (4), wherein (D) an ester interchange catalyst is further mixed.

(6) A thermoplastic resin composition, according to any one of the aforementioned (1) through (5), wherein (E) an inorganic filler is further mixed.

(7) A thermoplastic resin composition, according to any one of the aforementioned (1) through (6), wherein (F) an impact strength modifier is further mixed.

(8) A thermoplastic resin composition, according to any one of the aforementioned (1) through (7), wherein (A) the thermoplastic resin is a resin obtained by mixing (A-1) one or more selected from a polyester resin and polycarbonate resin and (A-2) one or more selected from a styrene-based resin, acrylic resin, polyarylate resin, polyphenylene ether resin and cyclohexylene terephthalate resin.

(9) A molded article obtained by molding the thermoplastic resin composition as set forth in any one of the aforementioned (1) through (8).

We thus provide a resin composition containing a thermoplastic resin and also a molded article thereof, respectively excellent in flowability and mechanical properties, and, in a preferred mode, also excellent in low warping property, laser transmittance and laser weldability.

MEANINGS OF SYMBOLS

Figure 1:
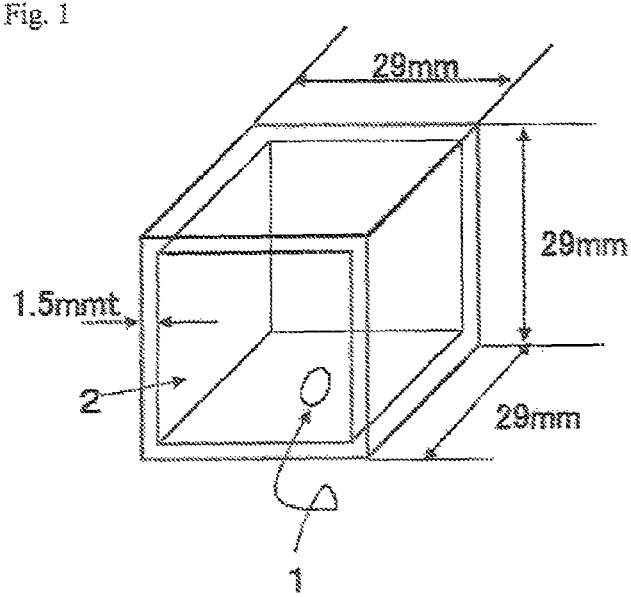
FIG. 1 is a perspective view showing the shape of a specimen used for evaluating the low warping property in the examples.

1 . . . gate position
2 . . . opening
3 . . . sprue
4 . . . runner
5 . . . gate position
6 . . . specimen for evaluating laser transmittance
7 . . . specimen for laser welding (transmitting side)
8 . . . specimen for laser welding (absorbing side)
9 . . . laser welding beam track
10 . . . laser beam irradiation device
11 . . . laser beam
12 . . . specimen for measuring laser welding strength
13 . . . laser weld zone
L . . . length of a side of a specimen
D . . . thickness of a specimen
W . . . width of a specimen
X . . . overlapping length
Y . . . welding distance

DETAILED DESCRIPTION

The (A) thermoplastic resin can be any melt moldable resin, and can also be a blend consisting of two or more thermoplastic resins (a resin composition in a strict sense). Examples of the thermoplastic resin include polyethylene resin, polypropylene resin, polymethylpentene resin, cyclic olefin-based resin, acrylonitrile/butadiene/styrene (ABS) resin, acrylonitrile/styrene (AS) resin, cellulose-based resin such as cellulose acetate, polyester resin, polyamide resin, polyacetal resin, polycarbonate resin, polyphenylene ether resin, polyarylate resin, polysulfone resin, polyphenylene sulfide resin, polyetheretherketone resin, polyimide resin and polyetherimide resin. Any one of them can be used alone or two or more can also be used together. Among them, in view of heat resistance, moldability, flowability and mechanical properties, a polyester resin, polyamide resin, polyacetal resin and polycarbonate resin are preferred, of which polyester resin, polyamide resin and polycarbonate resin are particularly preferred, and at least one or more selected from a polyester resin and polycarbonate resin are further preferred. Any one of them can be used alone, or two or more can also be used together as a polymer alloy.

In the case where a polyester resin is used as the (A) thermoplastic resin, the polyester resin is a homopolymer or copolymer with one or more selected from (a) a dicarboxylic acid or its ester formable derivative and a diol or its ester formable derivative, (b) a hydroxycarboxylic acid or its ester formable derivative, and (c) a lactone as the main structural units.

Examples of the abovementioned dicarboxylic acid or its ester formable derivative include aromatic dicarboxylic acids such as terephthalic acid, isophthalic acid, phthalic acid, 2,6-naphthalenedicarboxylic acid, 1,5-naphthalenedicarboxylic acid, bis(p-carboxyphenyl)methane, anthracenedicarboxylic acid, 4,4'-diphenyletherdicarboxylic acid, 5-tetrabutylphosphoniumisophthalic acid and 5-sodiumsulfoisophthalic acid, aliphatic dicarboxylic acids such as oxalic acid, succinic acid, adipic acid, sebacic acid, azelaic acid, dodecanedioic acid, malonic acid, glutaric acid and dimer acid, alicyclic dicarboxylic acids such as 1,3-cyclohexanedicarboxylic acid and 1,4-cyclohexanedicarboxylic acid, and their ester formable derivatives, etc.

Further, examples of the abovementioned diol or its ester formable derivative include aliphatic glycols with 2 to 20 carbon atoms such as ethylene glycol, propylene glycol, 1,4-butanediol, neopentyl glycol, 1,5-pentanediol, 1,6-hexanediol, decamethylene glycol, cyclohexanedimethanol, cyclohexanediol and dimer diol, long-chain glycols with a molecular weight of 200 to 100000 such as polyethylene glycol, poly-1,3-propylene glycol and polytetramethylene glycol, aromatic dioxy compounds such as 4,4'-dihydroxybiphenyl, hydroquinone, t-butylhydroquinone, bisphenol A, bisphenol S and bisphenol F, and their ester formable derivatives, etc.

Examples of the homopolymer or copolymer with a dicarboxylic acid or its ester formable derivative and a diol or its ester formable derivative as structural units include aromatic polyester resins such as polyethylene terephthalate, polypropylene terephthalate, polybutylene terephthalate, polycyclohexanedimethylene terephthalate, polyhexylene terephthalate, polyethylene isophthalate, polypropylene isophthalate, polybutylene isophthalate, polycyclohexanedimethylene isophthalate, polyhexylene isophthalate, polyethylene naphthalate, polypropylene naphthalate, polybutylene naphthalate, polyethylene isophthalate/terephthalate, polypropylene isophthalate/terephthalate, polybutylene isophthalate/terephthalate, polyethylene terephthalate/naphthalate, polypropylene terephthalate/naphthalate, polybutylene terephthalate/naphthalate, polybutylene terephthalate/decanedicarboxylate, polyethylene terephthalate/cyclohexanedimethylene terephthalate, polyethylene terephthalate/5-sodiumsulfoisophthalate, polypropylene terephthalate/5-sodiumsulfoisophthalate, polybutylene terephthalate/5-sodiumsulfoisophthalate, polyethylene terephthalate/polyethylene glycol, polypropylene terephthalate/polyethylene glycol, polybutylene terephthalate/polyethylene glycol, polyethylene terephthalate/polytetramethylene glycol, polypropylene terephthalate/polytetramethylene glycol, polybutylene terephthalate/polytetramethylene glycol, polyethylene terephthalate/isophthalate/polytetramethylene glycol, polypropylene terephthalate/isophthalate/polytetramethylene glycol, polybutylene terephthalate/isophthalate/polytetramethylene glycol, polyethylene terephthalate/succinate, polypropylene terephthalate/succinate, polybutylene terephthalate/succinate, polyethylene terephthalate/adipate, polypropylene terephthalate/adipate, polybutylene terephthalate/adipate, polyethylene terephthalate/sebacate, polypropylene terephthalate/sebacate, polybutylene terephthalate/sebacate, polyethylene terephthalate/isophthalate/adipate, polypropylene terephthalate/isophthalate/adipate, polybutylene terephthalate/isophthalate/succinate, polybutylene terephthalate/isophthalate/adipate and polybutylene terephthalate/isophthalate/sebacate, and aliphatic polyester resins such as polyethylene oxalate, polypropylene oxalate, polybutylene oxalate, polyethylene succinate, polypropylene succinate, polybutylene succinate, polyethylene adipate, polypropylene adipate, polybutylene adipate, polyneopentyl glycol adipate, polyethylene sebacate, polypropylene sebacate, polybutylene sebacate, polyethylene succinate/adipate, polypropylene succinate/adipate and polybutylene succinate/adipate.

Furthermore, examples of the abovementioned hydroxycarboxylic acid include glycolic acid, lactic acid, hydroxypropionic acid, hydroxybutyric acid, hydroxyvaleric acid, hydroxycaproic acid, hydroxybenzoic acid, p-hydroxybenzoic acid, 6-hydroxy-2-naphthoeic acid, and their ester formable derivatives, etc. Examples of the homopolymer or copolymer with a hydroxycarboxylic acid as structural units include aliphatic polyester resins such as polyglycolic acid, polylactic acid, polyglycolic acid/lactic acid, polyhydroxybutyric acid/β-hydroxybutyric acid/β-hydroxyvaleric acid, etc.

Moreover, examples of the abovementioned lactone include caprolactone, valerolactone, propiolactone, undecalactone, 1,5-oxepan-2-one, etc. Examples of the homopolymer or copolymer with a lactone as structural units include polycarprolactone, polyvalerolactone, polypropiolactone, polycaprolactone/valerolactone, etc.

Among them, homopolymers and copolymers with a dicarboxylic acid or its ester formable derivative and a diol or its ester formable derivative as main structural units are preferred, and homopolymers and copolymers with an aromatic dicarboxylic acid or its ester formable derivative and an aliphatic diol or its ester formable derivative as main structural units are more preferred. Homopolymers and copolymers with terephthalic acid or its ester formable derivative and an aliphatic diol selected from ethylene glycol, propylene glycol and butanediol or its ester formable derivative as main structural units are further more preferred. Among them, aromatic polyester resins such as polyethylene terephthalate, polypropylene terephthalate, polybutylene terephthalate, polycyclohexanedimethylene terephthalate, polyethylene naphthalate, polypropylene naphthalate, polybutylene naphthalate, polyethylene isophthalate/terephthalate, polypropylene isophthalate/terephthalate, polybutylene isophthalate/terephthalate, polyethylene terephthalate/naphthalate, polypropylene terephthalate/naphthalate and polybutylene terephthalate/naphthalate are especially preferred, and polybutylene terephthalate is most preferred.

It is preferred that the rate of terephthalic acid or its ester formable derivative among all the dicarboxylic acids of the homopolymer or copolymer with the abovementioned dicarboxylic acids or their ester formable derivatives and diols or their ester formable derivatives as main structural units is 30 mol % or more. More preferred is 40 mol % or more.

As the polyester resin, a liquid crystalline polyester capable of forming anisotropy at the time of melting can also be used. The structural units of a liquid crystalline polyester can be aromatic oxycarbonyl units, aromatic dioxy units, aromatic and/or aliphatic dicarbonyl units, alkylenedioxy units, or aromatic iminoxy units, etc.

Further, in view of flowability and mechanical properties, it is preferred to use two or more polyester resins, and a combination consisting of a non-liquid-crystalline polyester and a liquid crystalline polyester is especially preferred.

The concentration of the carboxyl terminal groups of the polyester resin is not especially limited, but in view of flowability, hydrolysis resistance and heat resistance, 50 eq/t or less is preferred and 30 eq/t or less is more preferred. Further more preferred is 20 eq/t or less, and especially preferred is 10 eq/t or less. The lower limit is 0 eq/t. Meanwhile, the concentration of the carboxyl terminal groups of the (A) thermoplastic resin refers to the value measured by dissolving into o-cresol/chloroform solvent and titrating with ethanolic potassium hydroxide.

The concentration of the vinyl terminal groups of the polyester resin is not especially limited, but in view of color tone and flowability, 15 eq/t or less is preferred and 10 eq/t or less is more preferred. Further more preferred is 5 eq/t or less. The lower limit is 0 eq/t. Meanwhile, in this invention, the concentration of the vinyl terminal groups of the (A) thermoplastic resin refers to the value measured by 1H-NMR using deuterated hexafluoroisopropanol solvent.

The concentration of the hydroxyl terminal groups of the polyester resin is not especially limited, but in view of moldability and flowability, 50 eq/t or more is preferred and 80 eq/t or more is more preferred. Further more preferred is 100 eq/t or more, and especially preferred is 120 eq/t or more. The upper limit is not especially limited but is 180 eq/t. Meanwhile, the concentration of the hydroxyl terminal groups of the (A) thermoplastic resin refers to the value measured by 1H-NMR using deuterated hexafluoroisopropanol solvent.

The viscosity of the polyester resin is not especially limited if the resin can be melt-kneaded. However, in view of moldability, it is preferred that the intrinsic viscosity measured in o-chlorophenol solution at 25° C. is in a range from 0.36 to 1.60 dl/g. A more preferred range is 0.50 to 1.50 dl/g.

It is preferred in view of heat resistance that the molecular weight of the polyester resin is in a range from more than 8000 to 500000 as weight average molecular weight (Mw). A more preferred range is more than 8000 to 300000, and a further more preferred range is more than 8000 to 250000. In this invention, Mw of the polyester resin refers to the value as polymethyl methacrylate (PMMA) measured by gel permeation chromatography (GPC) using hexafluoroisopropanol as a solvent.

The method for producing the polyester resin is not especially limited, and a publicly known polycondensation method, ring opening polymerization method or the like can be used for the production. Either batch polymerization or continuous poly-merization can be employed, and either an ester interchange reaction or a direct polymerization reaction can be applied. However, for such reasons that the concentration of carboxyl terminal groups can be kept small and that the flowability enhancing effect is large, continuous polymerization is preferred, and in view of cost, direct polymerization is preferred.

In the case where the polyester resin is a homopolymer or copolymer obtained by a condensation reaction using a dicarboxylic acid or its ester formable derivative and a diol or its ester formable derivative as main ingredients, the polyester resin can be produced by performing an esterification or ester interchange reaction of a dicarboxylic acid or its ester formable derivative and a diol or its ester formable derivative and subsequently performing a polycondensation reaction of the reaction product. Meanwhile, to effectively perform the esterification reaction or ester interchange reaction and the polycondensation reaction, it is preferred to add a polymerization reaction catalyst for these reactions. Examples of the polymerization reaction catalyst include organic titanium compounds such as the methyl ester, tetra-n-propyl ester, tetra-n-butyl ester, tetraisopropyl ester, tetraisobutyl ester, tetra-tert-butyl ester, cyclohexyl ester, phenyl ester, benzyl ester and tolyl ester of titanic acid and mixtures of these esters, tin compounds such as dibutyltin oxide, methylphenyltin oxide, tetraethyltin, hexaethylditin oxide, cyclohexahexylditin oxide, didodecyltin oxide, triethyltin hydroxide, triphenyltin hydroxide, triisobutyltin acetate, dibutyltin diacetate, diphenyltin dilaurate, monobutyltin trichloride, dibutyltin dichloride, tributyltin chloride, dibutyltin sulfide, butylhydroxytin oxide, and alkylstannonic acids such as methylstannonic acid, ethylstannonic acid and butylstannonic acid, zirconia compounds such as zirconium tetra-n-butoxide, antimony compounds such as antimony trioxide and antimony acetate, etc. Among them, organic titanium compounds and tin compounds are preferred, and further the tetra-n-propyl ester, tetra-n-butyl ester and tetraisopropyl ester of titanic acid are preferred. Tetra-n-butyl ester of titanic acid is especially preferred. Any one of these polymerization reaction catalysts can be used alone, or two or more of them can also be used together. It is preferred in view of mechanical properties, moldability and color tone that the added amount of the polymerization reaction catalyst is in a range from 0.005 to 0.5 parts by weight per 100 parts by weight of the polyester resin. A more preferred range is 0.01 to 0.2 part by weight.

In the case where a polycarbonate is used as the (A) thermoplastic resin, the polycarbonate is a polycarbonate obtained by using one or more dihydroxy compounds selected from bisphenol A, namely, 2,2'-bis(4-hydroxyphenyl)propane, 4,4'-dihydroxydiphenyl alkane, 4,4'-dihydroxydiphenyl sulfone and 4,4'-dihydroxydiphenyl ether, as the main raw material(s). Among them, preferred is a polycarbonate produced with bisphenol A, namely, 2,2'-bis(4-hydroxyphenyl)propane as a main raw material.

The method for producing the polycarbonate resin is not especially limited, and a publicly known ester interchange reaction or phosgene method can be used. Particularly, a polycarbonate obtained by an ester interchange method or phosgene method using the abovementioned bisphenol A or the like as a dihydroxy ingredient is preferred. Further, the bisphenol A can also be used together with another dihydroxy compound copolymerizable with it, such as 4,4'-dihydroxydiphenyl alkane, 4,4'-dihydroxydiphenyl sulfone, or 4,4'-dihydroxydiphenyl ether. It is preferred that the used amount of the other dihydroxy compound is 10 mole % or less based on the total amount of the dihydroxy compounds.

The polymerization degree of the polycarbonate resin is not especially limited, but it is preferred that the specific viscosity of the solution obtained by dissolving 0.7 g of the polycarbonate resin in 100 ml of methylene chloride, measured at 20° C. is in a range from 0.1 to 2.0, especially 0.5 to 1.5. The most preferred range is 0.8 to 1.5.

In the case where a polyamide is used as the (A) thermoplastic resin, the polyamide resin is a polyamide with an amino acid, lactam or diamine and a dicarboxylic acid as main components. Typical examples of the main components include amino acids such as 6-aminocaproic acid, 11-aminoundecanoic acid, 12-aminododecanoic acid and paraaminomethylbenzoic acid, lactams such as ε-caprolactam and ω-laurolactam, aliphatic, alicyclic and aromatic diamines such as pentamethylenediamine, hexamethylenediamine, 2-methylpentamethylenediamine, nonamethylenediamine, undecamethylenediamine, dodecamethylenediamine, 2,2,4-/2,4,4-trimethylhexamethylenediamine, 5-methylnonamethylenediamine, metaxylylenediamine, paraxylylenediamine, 1,3-bis(aminomethyl)cyclohexane, 1,4-bis(aminomethyl) cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl) propane, bis(aminopropyl)piperazine and aminoethylpiperazine, and aliphatic, alicyclic and aromatic dicarboxylic acids such as adipic acid, suberic acid, azelaic acid, sebacic acid, dodecanoic diacid, terephthalic acid, isophthalic acid, 2-chloroterephthalic acid, 2-methylterephthalic acid, 5-methylisophthalic acid, 5-sodiumsulfoisophthalic acid, 2,6-naphthalenedicarboxylic acid, hexahydroterephthalic acid and hexahydroisophthalic acid. Any one of the nylon homopolymers and copolymers derived from these raw materials can be used alone, or two or more of them can also be used as a mixture.

An especially useful polyamide resin is a polyamide resin with a melting point of 150° C. or higher excellent in heat resistance and strength. Particular examples of it include polycaproamide (nylon 6), polyhexamethylene adipamide (nylon 66), polypenta-methylene adipamide (nylon 56), polyhexamethylene sebacamide (nylon 610), polyhex-amethylene dodecamide (nylon 612), polyundecaneamide (nylon 11), polydodecaneamide (nylon 12), polycaproamide/polyhexamethylene adipamide copolymer (nylon 6/66), polycaproamide/polyhexamethylene terephthalamide copolymer (nylon 6/6T), polyhexamethylene adipamide/polyhexamethylene terephthalamide copolymer (nylon 66/6T), polyhexamethylene adipamide/polyhexamethylene isophthalamide copolymer (nylon 66/6I), polyhexamethylene terephthalamide/polyhexamethylene isophthalamide copolymer (nylon 6T/6I), polyhexamethylene terephthalamide/polydodecaneamide copolymer (nylon 6T/12), polyhexamethylene adipamide/polyhexamethylene terephthalamide/polyhexamethylene isophthalamide copolymer (nylon 66/6T/6I), polyxylylene adipamide (nylon XD6), polyhexamethylene terephthalamide/poly-2-methylpentamethylene terephthalamide copolymer (nylon 6T/M5T), polynonamethylene terephthalamide (nylon 9T), their mixtures, etc.

Among them, preferred polyamide resins include nylon 6, nylon 66, nylon 12, nylon 610, nylon 6/66 copolymer, copolymers having hexamethylene terephthalamide units such as nylon 6T/66 copolymer, nylon 6T/6I copolymer, nylon 6T/12 and nylon 6T/6 copolymer. Further, these polyamide resins can also be practically suitably used as mixtures in response to required properties such as impact resistance and moldability.

The polymerization degree of the polyamide resin is not especially limited, but a polyamide resin with a relative viscosity in a range from 1.5 to 7.0 as measured in 98% concentrated sulfuric acid solution at a sample concentration of 0.01 g/ml at 25° C. is preferred. An especially preferred range is 2.0 to 6.0.

The melting point of the (A) thermoplastic resin is not especially limited, but in view of heat resistance, 120° C. or higher is preferred. More preferred is 180° C. or higher, and further more preferred is 200° C. or higher. Especially preferred is 220° C. or higher. The upper limit is not especially limited, but 300° C. or lower is preferred. More preferred is 280° C. or lower. Meanwhile, the melting point of the (A) thermoplastic resin refers to the value of the peak top detected when a differential scanning calorimeter (DSC) is used for measuring at a heating rate of 20° C./min.

The glass transition temperature of the (A) thermoplastic resin is not especially limited, but in view of heat resistance, 80° C. or higher is preferred. More preferred is 100° C. or higher, and further more preferred is 120° C. or higher. Especially preferred is 140° C. or higher. The upper limit is not especially limited, but 300° C. or lower is preferred. More preferred is 280° C. or lower. Meanwhile, in this invention, the glass transition point of the (A) thermoplastic resin refers to the value of virtually the central point in the temperature range in which glass transition takes place, detected when a differential scanning calorimeter (DSC) is used for measuring at a heating rate of 20° C./min.

In view of excellent low warping property, it is preferred to use (A-1) one or more selected from a polyester resin and polycarbonate resin and (A-2) one or more amorphous resins selected from a styrene-based resin, acrylic resin, polyarylate resin, polyphenylene ether resin and cyclohexylene terephthalate resin together as the (A) thermoplastic resins.

In the above, the styrene-based resin can be any polymer having styrene structural units, namely, aromatic vinyl units. Examples of the styrene-based resin include (i) styrene resin, α-methylstyrene resin, (ii) an ABS resin obtained by graftpolymerizing an aromatic vinyl such as styrene, α-methylstyrene, dimethylstyrene or vinyl toluene and vinyl cyanide such as acrylonitrile or methacrylonitrile, and, as required, a further other polymerizable monomer such as methyl acrylate, ethyl acrylate, butyl acrylate, methyl methacrylate, ethyl methacrylate or butyl methacrylate to a conjugated dienebased rubber such as polybutadiene, butadiene/styrene copolymer or butadiene/acrylonitrile copolymer, (iii) an AS resin obtained by copolymerizing any of the aromatic vinyls exemplified above and vinyl cyanide, (iv) a high impact polystyrene resin obtained by copolymerizing any of the conjugated diene-based rubbers exemplified above and any of the aromatic vinyls exemplified above, and (v) a block copolymer consisting of any of the aromatic vinyls exemplified above and a diene. In the abovementioned block copolymer (v), the diene as a component can be either hydrogenated or non-hydrogenated. Examples of the diene include 1,3-butadiene, isoprene, 2,3-dimethyl-1,3-butadiene, 1,3-pentadiene, etc. It is not necessary to use only one of them, and two or more dienes can also be used together. The examples of the block copolymer include SBS resin (styrene/butadiene/styrene triblock copolymer), SIS (styrene/isoprene/styrene triblock copolymer), etc.

Especially in view of excellent low warping property, a polyarylate resin, polyphenylene ether resin, ABS resin and AS resin are more preferred as the (A-2) ingredient and an ABS resin and AS resins are more preferred. Among them, an AS resin is especially preferred.

In view of excellent low warping property, it is preferred to use 50 to 98 wt % of (A-1) one or more ingredients selected from a polyester resin and polycarbonate resin and 2 to 50 wt % of (A-2) one or more amorphous resin ingredients selected from a styrene-based resin, acrylic resin, polyarylate resin, polyphenylene ether resin and cyclohexylene terephthalate resin. It is more preferred that the amount of the (A-2) amorphous resin ingredient is 5 to 40 wt %. In the case where the amount of the (A-2) amorphous resin ingredient is less than 2 wt %, low warping property is insufficient though flowability and mechanical properties are sufficient. On the other hand, in the case where the amount of the (A-2) amorphous resin ingredient is more than 50 wt %, the high resistance and excellent chemicals resistance peculiar to a polyester resin tend to decline though low warping property is especially excellent. Therefore, it is preferred that the amount of the (A-2) amorphous resin ingredient is 2 to 50 wt %, since all of flowability, mechanical properties and low warping property are most excellent.

Further, a thermoplastic resin other than the abovementioned thermoplastic resins can be mixed to such an extent that excellence in flowability, mechanical properties and low warping property is not impaired. The resin that can be mixed can be any melt-moldable resin. Examples of the resin include polyethylene resin, polypropylene resin, polymethylpentene resin, cyclic olefin-based resin, cellulose-based resin such as cellulose acetate, polyamide resin, polyacetal resin, polysulfone resin, polyphenylene sulfide resin, polyetheretherketone resin, polyimide resin, polyetherimide resin, etc. It is not necessary to mix only one resin, and two or more resins can also be used together.

Furthermore, in view of excellence in low warping property, laser transmittance and laser weldability, it is preferred to use (A-1) both a polyester resin and a polycarbonate resin or (A-1) a polyester resin and (A-2) one or more amorphous resins selected from a styrene-based resin, acrylic resin, polyarylate resin, polyphenylene ether resin and cyclohexylene terephthalate resin as the (A) thermoplastic resins.

Especially in view of excellence in low warping property, laser transmittance and laser weldability, it is preferred to use (A-1) both a polyester resin and a polycarbonate resin, or (A-1) a polyester resin and (A-2) one or more amorphous resins selected from a polyarylate resin, polyphenylene ether resin, ABS resin, AS resin and cyclohexylene terephthalate resin, and it is especially preferred to use (A-1) both a polyester resin and a polycarbonate resin, or (A-1) a polyester resin and (A-2) one or more amorphous resins selected from an AS resin and cyclohexylene terephthalate resin.

In view of excellence in low warping property, laser transmittance and laser weldability, it is preferred to use 50 to 95 wt % of (A-1) a polyester resin and 50 to 5 wt % of a polycarbonate resin, or 50 to 95 wt % of (A-1) a polyester resin and 50 to 5 wt % of (A-2) one or more amorphous resins selected from a styrene-based resin, acrylic resin, polyarylate resin, polyphenylene ether resin and cyclohexylene terephthalate resin, and it is more preferred to use 50 to 92 wt % of (A-1) a polyester resin and 50 to 8 wt % of a polycarbonate resin, or 50 to 92 wt % of (A-1) a polyester resin and 50 to 8 wt % of (A-2) an amorphous resin ingredient. It is further more preferred to use 50 to 90 wt % of (A-1) a polyester resin and 50 to 10 wt % of a polycarbonate resin, or to use 50 to 90 wt % of (A-1) a polyester resin and 50 to 10 wt % of (A-2) an amorphous resin.

In the case of a thermoplastic resin composition containing 50 to 95 wt % of (A-1) a polyester resin and 50 to 5 wt % of a polycarbonate resin, if the mixed amount of the polycarbonate resin is less than 5 wt %, low warping property and laser transmittance are insufficient though flowability and mechanical properties are sufficient. On the other hand, if the mixed amount of the polycarbonate resin is more than 50 wt %, the high heat resistance and excellent chemicals resistance peculiar to the polyester resin tend to decline though low warping property is especially excellent. Therefore, it is preferred that the amount of the polycarbonate resin is 2 to 50 wt %, since all of flowability, mechanical properties, low warping property, laser transmittance and laser weldability are most excellent.

In the case of a thermoplastic resin composition containing 50 to 95 wt % of (A-1) a polyester resin and 50 to 5 wt % of (A-2) one or more amorphous resins selected from a styrene-based resin, acrylic resin, polyarylate resin, polyphenylene ether resin and cyclohexylene terephthalate resin, if the mixed amount of the (A-2) amorphous resins is less than 5 wt %, low warping property and laser transmittance are insufficient though flowability and mechanical properties are sufficient. On the other hand, if the mixed amount of the (A-2) amorphous resins is more than 50 wt %, the high heat resistance and excellent chemicals resistance peculiar to the polyester resin tend to decline, though low warping property is especially excellent. Therefore, it is preferred that the amount of the (A-2) amorphous resin ingredient is 2 to 50 wt %, since all of flowability, mechanical properties, low warping property, laser transmittance and laser weldability are most excellent.

Further, a thermoplastic resin other than the abovementioned thermoplastic resins can be mixed to such an extent that the excellence in flowability, mechanical properties, low warping property, laser transmittance and laser weldability is not impaired. The resin that can be mixed can be any meltmoldable resin. Examples of the other thermoplastic resin include polyethylene resin, polypropylene resin, polymethylpentene resin, cyclic olefin-based resin, cellulose-based resin such as cellulose acetate, polyamide resin, polyacetal resin, polysulfone resin, polyphenylene sulfide resin, polyetheretherketone resin, polyimide resin, polyetherimide resin, etc. It is not necessary to mix one resin only, and two or more resins can also be used together.

The (B) polyfunctional compound having three or more functional groups is an ingredient necessary for enhancing the flowability of the thermoplastic resin and is a compound in which at least one of the terminal structures having the functional groups is a structure represented by the formula (1):

(1)

where R denotes a hydrocarbon group with 1 to 15 carbon atoms; n denotes an integer of 1 to 10; and X denotes at least one type of functional group selected from hydroxyl group, aldehyde group, carboxyl group, sulfo group, glycidyl group, amino group, isocyanate group, carbodiimide group, oxazoline group, oxazine group, ester group, amide group, silanol group and silyl ether group.

In view of the excellence in flowability, recyclability, durability, mechanical properties, etc., it is preferred that R denotes an alkylene group, that n denotes an integer of 1 to 7, and that X denotes at least one type of functional group selected from hydroxyl group, carboxyl group, glycidyl group, amino group, isocyanate group, ester group and amide group, and it is more preferred that R denotes an alkylene group, that n denotes an integer of 1 to 5, and that X denotes at least one type of functional group selected from hydroxyl group, carboxyl group, glycidyl group, amino group and ester group. It is further more preferred that R denotes an alkylene group, that n denotes an integer of 1 to 4, and that X denotes at least one type of functional group selected from hydroxyl group, glycidyl group, amino group and ester group, and it is especially preferred that R denotes an alkylene group, that n denotes an integer of 1 to 3, and that X denotes a hydroxyl group. Meanwhile, in this invention, if R denotes an alkylene group, the structure represented by the formula (1) is a structure containing an alkylene oxide unit, and in view of excellent flowability, a polyfunctional group having three or more functional groups and containing alkylene oxide units is most preferred as the (B) ingredient. A preferred example of alkylene oxide units is aliphatic alkylene oxide units, and particular examples include methylene oxide units, ethylene oxide units, trimethylene oxide units, propylene oxide units, tetramethylene oxide units, 1,2-butylene oxide units, 2,3-butylene oxide units, isobutylene oxide units, etc. Especially in view of the excellent in flowability, recyclability, durability, heat resistance and mechanical properties, it is preferred to use a polyfunctional compound containing ethylene oxide units or propylene oxide units as the alkylene oxide units, and in view of the excellent in hydrolysis resistance and toughness (tensile break elongation), a polyfunctional compound containing propylene oxide units is especially preferred.

With regard to the number of alkylene oxide units contained in the (B) polyfunctional compound having three or more functional groups used in this invention, it is preferred that the number of alkylene oxide units per one functional group is 0.1 to 20. A more preferred range is 0.5 to 10, and a further more preferred range is 1 to 5.

The (B) ingredient is not especially limited if it is a polyfunctional compound having three or more functional groups in the molecule and having the abovementioned terminal structure, and can also be a low molecular compound or a polymer. Further, the polyfunctional compound can be any of trifunctional compound, tetrafunctional compound, pentafunctional compound, etc., as far as the polyfunctional compound has three or more functional groups. However, in view of the excellence in flowability and mechanical properties, a polyfunctional compound having four or more functional groups is more preferred, and a tetrafunctional compound is further more preferred.

In view of the excellence in flowability and mechanical properties, it is preferred that the (B) ingredient is a compound in which two or more of the terminal structure having the functional groups are structures represented by the formula (1), and it is more preferred that the (B) ingredient is a compound in which three or more of the terminal structures having the functional group are structures represented by the formula (1). It is further more preferred that the (B) ingredient is a compound in which all of the terminal structures having the functional groups are structures represented by the formula (1).

The functional groups in the (B) ingredient are at least one type or more selected from hydroxyl group, aldehyde group, carboxyl group, sulfo group, glycidyl group, amino group, isocyanate group, carbodiimide group, oxazoline group, oxazine group, ester group, amide group, silanol group and silyl ether group. In the case where the (B) ingredient is a compound in which two or more terminal structure having the functional groups are structures represented by the formula (1), the functional groups can be identical with or different from each other among the groups enumerated above, but in view of flowability, mechanical properties, durability, heat resistance and productivity, it is preferred that the functional groups are identical with each other. In the case where the functional groups are hydroxyl groups, preferred examples of the (B) ingredient are (poly)oxy-methylene glycerol, (poly)oxyethylene glycerol, (poly)oxytrimethylene glycerol, (poly)oxy-propylene glycerol, (poly)oxyethylene-(poly)oxypropylene glycerol, (poly)oxytetramethylene glycerol, (poly)oxymethylene diglycerol, (poly)oxyethylene diglycerol, (poly)oxytrimethylene diglycerol, (poly)oxypropylene diglycerol, (poly)oxymethylene trimethylolpropane, (poly)oxyethylene trimethylolpropane, (poly)oxytrimethylene trimethylolpropane, (poly)oxypropylene trimethylolpropane, (poly)oxyethylene-(poly)oxypropylene trimethlolpropane, (poly)oxy-tetramethylene trimethlolpropane, (poly)oxymethylene ditrimethylolpropane, (poly)oxyethylene ditrimethylolpropane, (poly)oxytrimethylene ditrimethylolpropane, (poly)oxypropylene ditrimethylolpropane, (poly)oxymethylene pentaerythritol, (poly)oxyethylene pentaerythritol, (poly)oxytrimethylene pentaerythritol, (poly)oxypropylene pentaerythritol, (poly)oxyethylene-(poly)oxypropylene pentaerythritol, (poly)oxytetramethylene pentaerythritol, (poly)oxy-methylene dipentaerythritol, (poly)oxyethylene dipentaerythritol, (poly)oxytrimethylene dipentaerythritol, (poly)oxypropylene dipentaerythritol, (poly)oxymethylene glucose, (poly)oxyethylene glucose, (poly)oxytrimethlene glucose, (poly)oxypropylene glucose, (poly)oxyethylenene-(poly)oxypropylene glucose, (poly)oxytetramethylene glucose, etc.

Further, in the case where the functional groups are carboxyl groups, preferred examples of the (B) ingredient include propane-1,2,3-tricarboxylic acid containing (poly)methylene oxide units, propane-1,2,3-tricarboxylic acid containing (poly)ethylene oxide units, propane-1,2,3-tricarboxylic acid containing (poly)trimethylene oxide units, propane-1,2,3-tricarboxylic acid containing (poly)propylene oxide units, propane-1,2,3-tricarboxylic acid containing (poly)tetramethylene oxide units, 2-methylpropane-1,2,3-triscarboxylic acid containing (poly)methylene oxide units, 2-methylpropane-1,2,3-triscarboxylic acid containing (poly)ethylene oxide units, 2-methylpropane-1,2,3-triscarboxylic acid containing (poly)tri-methylene oxide units, 2-methylpropane-1,2,3-triscarboxylic acid containing (poly)propylene oxide units, 2-methylpropane-1,2,3-triscarboxylic acid containing (poly)tetramethylene oxide units, butane-1,2,4-tricarboxylic acid containing (poly)methylene oxide units, butane-1,2,4-tricarboxylic acid containing (poly)ethylene oxide units, butane-1,2,4-tricarboxylic acid containing (poly)trimethylene oxide units, butane-1,2,4-tricarboxylic acid containing (poly)propylene oxide units, butane-1,2,4-tricarboxylic acid containing (poly)tetramethylene oxide units, butane-1,2,3,4-tetracarboxylic acid containing (poly)methylene oxide units, butane-1,2,3,4-tetracarboxylic acid containing (poly)ethylene oxide units, butane-1,2,3,4-tetracarboxylic acid containing (poly)trimethylene oxide units, butane-1,2,3,4-tetracarboxylic acid containing (poly)propylene oxide units, butane-1,2,3,4-tetracarboxylic acid containing (poly)tetramethylene oxide units, trimellitic acid containing (poly)methylene oxide units, trimellitic acid containing (poly)ethylene oxide units, trimellitic acid containing (poly)trimethylene oxide units, trimellitic acid containing (poly)propylene oxide units, trimellitic acid containing (poly)tetramethylene oxide units, trimesic acid containing (poly)methylene oxide units, trimesic acid containing (poly)ethylene oxide units, trimesic acid containing (poly)trimethylene oxide units, trimesic acid containing (poly)propylene oxide units, trimesic acid containing (poly)tetramethylene oxide units, hemimellitic acid containing (poly)methylene oxide units, hemimellitic acid containing (poly)ethylene oxide units, hemimellitic acid containing (poly)trimethylene oxide units, hemimellitic acid containing (poly)propylene oxide units, hemimellitic acid containing (poly)tetramethylene oxide units, pyromellitic acid containing (poly)methylene oxide units, pyromellitic acid containing (poly)ethylene oxide units, pyromellitic acid containing (poly)trimethylene oxide units, pyromellitic acid containing (poly)propylene oxide units, pyromellitic acid containing (poly)tetramethylene oxide units, cyclohexane-1,3,5-tricarboxylic acid containing (poly)methylene oxide units, cyclohexane-1,3,5-tricarboxylic acid containing (poly)ethylene oxide units, cyclohexane-1,3,5-tricarboxylic acid containing (poly)trimethylene oxide units, cyclohexane-1,3,5-tricarboxylic acid containing (poly)propylene oxide units, cyclohexane-1,3,5-tricarboxylic acid containing (poly)tetramethylene oxide units, etc.

Furthermore, in the case where the functional groups are amino groups, preferred examples of the (B) ingredient include 1,2,3-triaminopropane containing (poly)methylene oxide units, 1,2,3-triaminopropane containing (poly)ethylene oxide units, 1,2,3-triaminopropane containing (poly)trimethylene oxide units, 1,2,3-triaminopropane containing (poly)propylene oxide units, 1,2,3-triaminopropane containing (poly)tetramethylene oxide units, 1,2,3-triamino-2-methylpropane containing (poly)methylene oxide units, 1,2,3-triamino-2-methylpropane containing (poly)ethylene oxide units, 1,2,3-triamino-2-methylpropane containing (poly)trimethylene oxide units, 1,2,3-triamino-2-methylpropane containing (poly)propylene oxide units, 1,2,3-triamino-2-methylpropane containing (poly)tetramethylene oxide units, 1,2,4-triaminobutane containing (poly)methylene oxide units, 1,2,4-triaminobutane containing (poly)ethylene oxide units, 1,2,4-triaminobutane containing (poly)trimethylene oxide units, 1,2,4-triaminobutane containing (poly)propylene oxide units, 1,2,4-triaminobutane containing (poly)tetramethylene oxide units, 1,2,3,4-tetraminobutane containing (poly)methylene oxide units, 1,2,3,4-tetraminobutane containing (poly)ethylene oxide units, 1,2,3,4-tetraminobutane containing (poly)trimethylene oxide units, 1,2,3,4-tetraminobutane containing (poly)propylene oxide units, 1,2,3,4-tetraminobutane containing (poly)tetramethylene oxide units, 1,3,5-triaminocyclohexane containing (poly)methylene oxide units, 1,3,5-triaminocyclohexane containing (poly)ethylene oxide units, 1,3,5-triaminocyclohexane containing (poly)trimethylene oxide units, 1,3,5-triaminocyclohexane containing (poly)propylene oxide units, 1,3,5-triaminocyclohexane containing (poly)tetramethylene oxide units, 1,2,4-triaminocyclohexane containing (poly)methylene oxide units, 1,2,4-triaminocyclohexane containing (poly)ethylene oxide units, 1,2,4-triaminocyclohexane containing (poly)trimethylene oxide units, 1,2,4-triaminocyclohexane containing (poly)propylene oxide units, 1,2,4-triaminocyclohexane containing (poly)tetramethylene oxide units, 1,2,4,5-tetraminocyclohexane containing (poly)methylene oxide units, 1,2,4,5-tetraminocyclohexane containing (poly)ethylene oxide units, 1,2,4,5-tetraminocyclohexane containing (poly)trimethylene oxide units, 1,2,4,5-tetraminocyclohexane containing (poly)propylene oxide units, 1,2,4,5-tetraminocyclohexane containing (poly)tetramethylene oxide units, 1,3,5-triaminobenzene containing (poly)methylene oxide units, 1,3,5-triaminobenzene containing (poly)ethylene oxide units, 1,3,5-triaminobenzene containing (poly)trimethylene oxide units, 1,3,5-triaminobenzene containing (poly)propylene oxide units, 1,3,5-triaminobenzene containing (poly)tetramethylene oxide units, 1,2,4-triaminobenzene containing (poly)methylene oxide units, 1,2,4-triaminobenzene containing (poly)ethylene oxide units, 1,2,4-triaminobenzene containing (poly)trimethylene oxide units, 1,2,4-triaminobenzene containing (poly)propylene oxide units, 1,2,4-triaminobenzene containing (poly)tetramethylene oxide units, etc.

Moreover, in the case where the functional groups are ester groups, preferred examples of the (B) ingredient include the aliphatic acid esters and aromatic acid esters of the (B) polyfunctional compounds enumerated for the case where the functional groups are hydroxyl groups, the ester derivatives of the (B) polyfunctional compounds enumerated for the case where the functional groups are carboxyl groups, etc.

Further, in the case where the functional groups are amide groups, preferred examples of the (B) ingredient include the amide derivatives of the (B) polyfunctional compounds enumerated for the case where the functional groups are carboxyl groups, etc.

In view of flowability, especially preferred examples of the (B) ingredient include (poly)oxyethylene glycerol, (poly)oxypropylene glycerol, (poly)oxyethylene diglycerol, (poly)oxypropylene diglycerol, (poly)oxyethylene trimethylolpropane, (poly)oxypropylene trimethylolpropane, (poly)oxyethylene ditrimethylolpropane, (poly)oxypropylene ditrimethylolpropane, (poly)oxyethylene pentaerythritol, (poly)oxypropylene pentaerythritol, (poly)oxyethylene dipentaerythritol and (poly)oxypropylene dipentaerythritol in the case where the functional groups are hydroxyl groups, propane-1,2,3-tricarboxylic acid containing (poly)ethylene oxide units, propane-1,2,3-tricarboxylic acid containing (poly)propylene oxide units, trimellitic acid containing (poly)ethylene oxide units, trimellitic acid containing (poly)propylene oxide units, trimesic acid containing (poly)ethylene oxide units, trimesic acid containing (poly)propylene oxide units, cyclohexane-1,3,5-tricarboxylic acid containing (poly)ethylene oxide units and cyclohexane-1,3,5-tricarboxylic acid containing (poly)propylene oxide units in the case where the functional groups are carboxyl groups, 1,2,3-triaminopropane containing (poly)ethylene oxide units, 1,2,3-triaminopropane containing (poly)propylene oxide units, 1,3,5-triaminocyclohexane containing (poly)ethylene oxide units, 1,3,5-triaminocyclohexane containing (poly)propylene oxide units, 1,3,5-triaminobenzene containing (poly)ethylene oxide units and 1,3,5-triaminobenzene containing (poly)propylene oxide units in the case where the functional groups are amino groups.

The (B) ingredient used in this invention can react with the (A) thermoplastic resin, to be introduced into the main chain and side chains of the (A) ingredient, or can also keep its original structure without reacting with the (A) ingredient.

It is preferred that the viscosity of the (B) ingredient is 15000 m·Pa or less at 25° C., and in view of flowability and mechanical properties, 5000 m·Pa or less is more preferred. Especially preferred is 2000 m·Pa or less. The lower limit is not especially limited, but in view of the bleeding property at the time of molding, 100 m·Pa or more is preferred. It is not preferred that the viscosity at 25° C. is higher than 15000 m·Pa, since the effect of enhancing the flowability is insufficient.

It is preferred in view of flowability that the molecular weight or weight average molecular weight (Mw) of the (B) ingredient is in a range from 50 to 10000. A more preferred range is 150 to 8000, and a further more preferred range is 200 to 3000. The Mw of the (B) ingredient refers to the value as polymethyl meth-acrylate (PMMA) measured by gel permeation chromatography (GPC) using hexafluoroiso-propanol as a solvent.

It is preferred that the water content of the (B) ingredient is 1% or less. A water content of 0.5% or less is more preferred, and 0.1% or less is further more preferred. There is no particular lower limit for the water content of the (B) ingredient. A water content of higher than 1% is not preferred, since the mechanical properties decline.

It is necessary that the mixed amount of the (B) ingredient is in a range from 0.1 to 4 parts by weight per 100 parts by weight of the (A) ingredient, and the range preferred in view of flowability and mechanical properties is 0.1 to 2 parts by weight. A more preferred range is 0.1 to 1 part by weight, and a further more preferred range is 0.2 to 0.7 part by weight.

With regard to the combination consisting of the (A) thermoplastic resin and the (B) polyfunctional compound having three or more functional groups, in the case where the (A) ingredient is a polyester resin, it is preferred in view of excellent flowability that the (B) ingredient has at least one or more hydroxyl groups or carboxyl groups. It is more preferred that the (B) ingredient has three or more hydroxyl groups or carboxyl groups, and it is further more preferred that the (B) ingredient has three or more hydroxyl groups. It is especially preferred that all the functional groups of the ingredient (B) are hydroxyl groups.

It is preferred that (C) a terminal blocking agent having less than three functional groups is mixed since flowability and hydrolysis resistance can be enhanced. It is preferred in view of the excellence in flowability and hydrolysis resistance that the mixed amount of the (C) terminal blocking agent having less than three functional groups is in a range from 0.01 to 50 parts by weight per 100 parts by weight of the (A) thermoplastic resin. A more preferred range is 0.01 to 30 parts by weight, and a further more preferred range is 0.05 to 20 parts by weight. An especially preferred range is 0.1 to 10 parts by weight, and the most preferred range is 0.5 to 3 parts by weight.

It is preferred that the functional groups of the (C) terminal blocking agent having less than three functional groups are at least one type or more selected from glycidyl groups, acid anhydride groups, carbodiimide groups and oxazoline groups. In view of flowability and hydrolysis resistance, a reactive compound containing glycidyl groups is more preferred. One reactive compound can be used, but in view of hydrolysis resistance, it is preferred to use two or more reactive compounds together. As the glycidyl compounds, preferably used are glycidyl ether compounds, glycidyl ester compounds, glycidylamine compounds, glycidylimide compounds and alicyclic epoxy compounds. In view of hydrolysis resistance, glycidyl ether compounds and glycidyl ester compounds are more preferred.

Examples of the glycidyl ether compounds include bisphenol A diglycidyl ether epoxy resin, bisphenol F diglycidyl ether epoxy resin, bisphenol S diglycidyl ether epoxy resin, etc. obtained by the condensation reaction between bisphenols and epichlorohydrin, such as butyl glycidyl ether, stearyl glycidyl ether, allyl glycidyl ether, phenyl glycidyl ether, o-phenylphenyl glycidyl ether, ethylene oxide lauryl alcohol glycidyl ether, ethylene oxide phenol glycidyl ether, ethylene glycol diglycidyl ether, polyethylene glycol diglycidyl ether, propylene glycol diglycidyl ether, polypropylene glycol diglycidyl ether, neopentyl glycol diglycidyl ether, polytetramethylene glycol diglycidyl ether, cyclohexane dimethanol diglycidyl ether, glycerol triglycidyl ester, trimethylolpropane triglycidyl ether, pentaerythritol polyglycidyl ether, 2,2-bis-(4-hydroxyphenyl)propane, 2,2-bis(4-hydroxyphenyl) methane and bis(4-hydroxyphenyl)sulfone. Among them, bisphenol A diglycidyl ether epoxy resin is preferred. In this invention, it is preferred that the added amount of the glycidyl ether compound is 0.1 to 5 parts by weight per 100 parts by weight of the (A) thermoplastic resin. A more preferred range is 0.5 to 3 parts by weight, and the most preferred range is 1.0 to 2.5 parts by weight.

Examples of the glycidyl ester compounds include benzoic acid glycidyl ester, p-toluic acid glycidyl ester, cyclohexanecarboxylic acid glycidyl ester, stearic acid glycidyl ester, lauric acid glycidyl ester, palmitic acid glycidyl ester, versatic acid glycidyl ester, oleic acid glycidyl ester, linoleic acid glycidyl ester, linolenic acid glycidyl ester, terephthalic acid diglycidyl ester, isophthalic acid diglycidyl ester, phthalic acid diglycidyl ester, naphthalenecarboxylic acid diglycidyl ester, bibenzoic acid diglycidyl ester, methylterephthalic acid diglycidyl ester, hexahydrophthalic acid diglycidyl ester, tetrahydrophthalic acid diglycidyl ester, cyclohexanedicarboxylic acid diglycidyl ester, adipic acid diglycidyl ester, succinic diglycidyl ester, sebacic acid diglycidyl ester, dodecanedionic acid diglycidyl ester, octadecanedicarboxylic acid diglycidyl ester, trimellitic acid triglycidyl ester, pyromellitic acid tetraglycidyl ester, etc. Among them, benzoic acid glycidyl ester and versatic acid glycidyl ester are preferred. It is preferred that the added amount of the glycidyl ester compound is 0.1 to 3 parts by weight per 100 parts by weight of the (A) thermoplastic resin. A more preferred range is 0.1 to 2 parts by weight, and the most preferred range is 0.3 to 1.5 parts by weight.

In the case where a polyester resin is used as the (A) thermoplastic resin, in view of excellent flowability, it is preferred to further mix (D) an ester interchange catalyst. It is preferred in view of the excellence in flowability and mechanical properties that the mixed amount of the (D) ester interchange catalyst is in a range from 0.0005 to 1 part by weight per 100 parts by weight of the (A) thermoplastic resin. A more preferred range is 0.001 to 0.1 part by weight.

The (D) ester interchange catalyst is not limited if it is a catalyst used for ordinary ester interchange. Examples of the catalyst include metals such as lithium, sodium, potassium, cesium, magnesium, calcium, barium, strontium, zinc, aluminum, titanium, cobalt, germanium, tin, lead, antimony, cerium and manganese, metal compounds of these metals such as organic metal compounds, metal alkoxides, metal oxides and metal halides. Especially preferred particular examples of the (D) ester interchange catalyst include dibutyltin oxide, antimony trioxide, antimony acetate, titanic acid tetra-n-butyl ester, etc. Any one of these ester interchange catalysts can be used alone or two or more of them can also be used together.

It is preferred to further mix (E) an inorganic filler for letting the resin composition have mechanical strength and other properties. In view of the excellence in flowability and mechanical properties, it is preferred that the mixed amount of the (E) inorganic filler is in a range from 0.1 to 120 parts by weight per 100 parts by weight of the (A) thermoplastic resin. A more preferred range is 1 to 70 parts by weight, and a further more preferred range is 1 to 50 parts by weight.

As the (E) inorganic filler, any of fibrous, sheet-like, powder and granular fillers can be used. Examples of the filler include fibrous and whisker-like fillers such as glass fibers, metal fibers including PAN-based or pitch-based carbon fibers, stainless steel fibers, aluminum fibers and brass fibers, organic fibers including aromatic polyamide fibers, gypsum fibers, ceramic fibers, asbestos fibers, zirconia fibers, alumina fibers, silica fibers, titanium oxide fibers, silicon carbide fibers, rock wool, potassium titanate whiskers, barium titanate whiskers, aluminum borate whiskers and silicon nitride whiskers, and powdery, granular and sheet-like fillers such as mica, talc, kaolinite, silica, calcium carbonate, glass beds, glass flakes, glass microballoons, molybdenum disulfide, wollastonite, titanium oxide, zinc oxide, aluminum oxide, calcium polyphosphate, graphite and barium sulfate. Among them, glass fibers are preferred. The glass fibers are not especially limited in type if the fibers are those generally used for reinforcing resins. For examples, long fibers and short fibers such as chopped strands and milled fibers can be selectively used. Further, two or more kinds of the abovementioned (E) inorganic fillers can also be used together. Meanwhile, the (E) inorganic filler used in this invention can also be treated on the surface with a publicly known coupling agent (for example, a silane coupling agent such as aminosilane or epoxy silane, titanate-based coupling agent, etc.) or any other surface treating agent. Glass fibers can also be covered or bundled with a thermoplastic resin such as ethylene/vinyl acetate copolymer or a thermosetting resin such as an epoxy resin.

To let the resin composition have mechanical strength and other properties, it is preferred to further mix (F) an impact strength modifier. In view of the excellence in flowability and mechanical properties, it is preferred that the mixed amount of the (F) impact strength modifier is in a range from 0.1 to 100 parts by weight per 100 parts by weight of the (A) thermoplastic resin. A more preferred range is 1 to 70 parts by weight, and a further more preferred range is 1 to 50 parts by weight.

As the (F) impact strength modifier, any impact strength modifier publicly known for thermoplastic resins can be used. Examples of it include natural rubber, polyethylene including low density polyethylene and high density polyethylene, polypropylene, impact strength modifying polystyrene, polybutadiene, styrene/butadiene copolymer, ethylene/propylene copolymer, ethylene/methyl acrylate copolymer, ethylene/ethyl acrylate copolymer, ethylene/vinyl acetate copolymer, ethylene/glycidyl methacrylate copolymer, polyester elastomers such as polyethylene terephthalate/poly(tetramethylene oxide) glycol block copolymer and polyethylene terephthalate/isophthalate/poly(tetramethylene oxide)glycol block copolymer, MBS or acrylic core shell elastomers. Any one or more of them can be used.

In the case where a polyester resin is used as the (A) thermoplastic resin, in view of excellent flowability, it is preferred to further mix (G) a polyester with a weight average molecular weight (Mw) of 100 to 8000 (hereinafter referred to as a low molecular weight polyester). In view of flowability, it is preferred that the mixed amount of the (G) low molecular weight polyester is in a range from 0.1 to 10 parts by weight per 100 parts by weight of the (A) thermoplastic resin. A more preferred range is 0.2 to 5 parts by weight.

In view of flowability, mechanical properties and bleedout, it is preferred that the Mw of the (G) low molecular weight polyester is in a range from 300 to 7000. A more preferred range is 500 to 5000. The Mw of the low molecular weight polyester refers to the value as polymethyl methacrylate (PMMA) measured by gel permeation chromatography (GPC) using hexafluoroisopropanol as a solvent.

Further, the (G) low molecular weight polyester is a homopolymer or copolymer with one or more selected from a dicarboxylic acid or its ester formable derivative, a diol or its ester formable derivative, a hydroxycarboxylic acid or its ester formable derivative, and a lactone as main structural units. In view of flowability and mechanical properties, a dicarboxylic acid or its ester formable derivative and a diol or its ester formable derivative are preferred. Further, the low molecular weight polyester can be any of an aromatic polyester, aliphatic polyester and alicyclic polyester.

One or more additives selected from a crystal nucleating agent, plasticizer, ultraviolet absorber, antimicrobial agent, stabilizer, releasing agent, colorant including pigment and dye, lubricant, antistatic agent and flame retarder can be added to such an extent that the effects of this invention are not impaired.

As the crystal nucleating agent, any crystal nucleating agent used for thermoplastic resins can be used, and either an inorganic crystal nucleating agent or an organic crystal nucleating agent can be used. Examples of the inorganic crystal nucleating agent include metal salts such as talc, montmorillonite, synthetic mica, clay, zeolite, magnesium oxide, calcium sulfide, boron nitride, neodymium oxide and phenyl phosphate. It is preferred that any of these inorganic crystal nucleating agents is modified by an organic substance for enhancing the dispersibility in the composition. Further, examples of the organic crystal nucleating agent include organic carboxylic acid metal salts such as sodium benzoate, potassium benzoate, lithium benzoate, calcium benzoate, magnesium benzoate, barium benzoate, lithium terephthalate, sodium terephthalate, potassium terephthalate, sodium toluylate, sodium salicylate, potassium salicylate, zinc salicylate, aluminum dibenzoate, potassium dibenzoate, lithium dibenzoate, sodium β-naphthalate and sodium cyclohexanecarboxylate, organic sulfonates such as sodium p-toluenesulfonate and sodium sulfoisophthalate, sorbitol-based compounds, phosphorus compound metal salts such as sodium-2,2'-methylenebis(4,6-di-t-butylphenyl)phosphate, etc. If any of these crystal nucleating agents is mixed, a thermoplastic resin composition and a molded article respectively excellent in mechanical properties, moldability, heat resistance and durability can be obtained.

As the stabilizer, any stabilizer used for thermoplastic resins can be used. Examples of the stabilizer include antioxidants, photostabilizers, etc. If any of these stabilizers is mixed, a thermoplastic resin composition and a molded article respectively excellent in mechanical properties, moldability, heat resistance and durability can be obtained.

As the releasing agent, any releasing agent used for thermoplastic resins can be used. Examples of the releasing agent include a fatty acid, fatty acid metal salt, oxy fatty acid, fatty acid ester, aliphatic partially saponified ester, paraffin, low molecular weight polyolefin, fatty acid amide, alkylene bis fatty acid amide, aliphatic ketone and modified silicone, etc. If any of these releasing agents is mixed, a molded article excellent in mechanical properties, moldability, heat resistance and durability can be obtained.

As the flame retarder, at least one flame retarder selected from a bromine-based flame retarder, chlorine-based flame retarder, phosphorus-based flame retarder, nitrogen compound-based flame retarder, silicone-based flame retarder and other inorganic flame retarder can be used. In view of the excellence in flame retardancy and mechanical properties, it is preferred to use two or more flame retarders selected from the flame retarders enumerated above.

Examples of the bromine-based flame retarder include decabromodiphenyl oxide, octabromodiphenyl oxide, tetrabromodiphenyl oxide, tetrabromo-phthalic anhydride, hexabromocyclododecane, bis(2,4,6-tribromophenoxy) ethane, ethylene bistetrabromophthal imide, hexabromobenzene, 1,1-sulfonyl[3,5-dibromo-4-(2,3-dibromopropoxy)] benzene, polydibromophenylene oxide, tetrabromobisphenol-S, tris(2,3-dibromopropyl-1) isocyanurate, tribromophenol, tribromophenyl allyl ether, tribromoneopentyl alcohol, bromated polystyrene, bromated polyethylene, tetrabromobisphenol-A, tetrabromobisphenol-A derivative, bromated epoxy resins such as tetrabromobisphenol-A-epoxy oligomer or polymer and bromated phenol novolak epoxy, tetrabromobisphenol-A-carbonate oligomer or polymer, tetrabromobisphenol-A-bis(2-hydroxydiethyl ether), tetrabromobisphenol-A-bis(2,3-dibromopropyl ether), tetrabromobisphenol-A-bis(allyl ether), tetrabromocyclooctane, ethylene bispentabromodiphenyl, tris(tribromoneopentyl) phosphate, poly(pentabromobenzyl polyacrylate), octabromotrimethylphenylindane, dibromoneopentyl glycol, pentabromobenzyl polyacrylate, dibromocresyl glycidyl ether, N,N'-ethylene-bis-tetrabromoterephthalimide, etc. Among them, tetrabromobisphenol-A-epoxy oligomer, tetrabromobisphenol-A-carbonate oligomer, and bromated epoxy resin are preferred.

Examples of the chlorine-based flame retarder include chlorinated paraffin, chlorinated polyethylene, perchlorocyclopentadecane, tetrachlorophthalic anhydride, etc.

Examples of the phosphorus-based flame retarder include generally used ordinary phosphorus-based flame retarders. Typical examples are organic phosphorus-based compounds such as phosphoric acid ester, condensed phosphoric acid ester and polyphosphate, and red phosphorus. In view of the excellence in flowability, mechanical properties and flame retardancy, any one or more of a condensed phosphoric acid ester, polyphosphate and red phosphorus are preferred, and a condensed phosphoric acid ester is more preferred. An aromatic condensed phosphoric acid ester is further more preferred. Examples of the aromatic condensed phosphoric acid ester include resorcinol polyphenyl phosphate, resorcinol poly(di-2,6-xylyl) phosphate, etc.

Examples of the nitrogen compound-based flame retarder include an aliphatic amine compound, aromatic amine compound, nitrogen-containing heterocyclic compound, cyan compound, aliphatic amide, aromatic amide, urea, thiourea, etc. In view of the excellence in flame retardancy and mechanical properties, a nitrogen-containing heterocyclic compound is preferred, and above all, a triazine compound is preferred. Melamine cyanurate or melamine isocyanurate is more preferred. Above all, an addition product consisting of cyanuric acid or isocyanuric acid and a triazine compound is preferred, and usually an addition product with a 1:1 (molar ratio) composition, or as the case may be, with a 1:2 (molar ratio) composition can be used. Meanwhile, in the case where the dispersibility of the abovementioned nitrogen compound-based flame retarder is poor, a dispersing agent such as tris (β-hydroxyethyl) isocyanurate or a publicly known surface treating agent, etc. can also be used together.

Examples of the silicone-based flame retarder used in this invention include a silicone resin and silicone oil. Examples of the silicone resin include resins with a three-dimensional network structure formed by combining structural units of $RSiO_{3/2}$, $R_2SiO$ and $R_3SiO_{1/2}$, where R denotes an alkyl group such as methyl group, ethyl group or propyl group, or an aromatic group such as phenyl group or benzyl group, or a substituent group having a vinyl group contained in any of the abovementioned substituent groups. Examples of the silicone oil include polydimethylsiloxanes and modified polysiloxanes in which at least one methyl group at a side chain or terminal of a polydimethylsiloxane is modified by at least one group selected from hydrogen element, alkyl group, cyclohexyl group, phenyl group, benzyl group, amino group, epoxy group, polyether group, carboxyl group, mercapto group, chloroalkyl group, alkyl higher alcohol ester group, alcohol group, aralkyl group, vinyl group and trifluoromethyl group, and their mixtures.

Examples of the other inorganic flame retarder include magnesium hydroxide, aluminum hydroxide, antimony trioxide, antimony pentoxide, sodium antimonate, zinc hydroxystannate, zinc stannate, metastannic acid, tin oxide, zinc sulfate, zinc oxide, ferrous oxide, ferric oxide, stannous oxide, stannic oxide, zinc borate, ammonium borate, ammonium octamolybdate, metal salts of tungstate, a complex oxide acid of tungsten and a metalloid, ammonium sulfamate, ammonium bromide, zirconium-based compound, guanidine-based compound, fluorine-based compound, graphite, swellable graphite, etc. In this invention, in view of the excellent in flame retardancy and mechanical properties, magnesium hydroxide, fluorine-based compound and swellable graphite are preferred, and a fluorine-based compound is more preferred. Preferred examples of the fluorine-based compound include polytetrafluoroethylene, polyhexafluoropropylene, tetrafluoroethylene/hexafluoropropylene copolymer, tetrafluoroethylene/perfluoroalkyl vinyl ether copolymer, tetrafluoroethylene/ethylene copolymer, hexafluoropropylene/propylene copolymer, polyvinylidene fluoride, vinylidene fluoride/ethylene copolymer, etc. A polytetrafluoroethylene-containing mixed powder consisting of polytetrafluoroethylene particles and an organic polymer is also preferred.

It is preferred that the mixed amount of the flame retarder is 0.5 to 150 parts by weight per 100 parts by weight of the thermoplastic resin. A more preferred range is 1 to 150 parts by weight, and a further more preferred range is 1.2 to 150 parts by weight. An especially preferred range is 1.2 to 100 parts by weight and the most preferred range is 2 to 80 parts by weight.

The method for producing the resin composition is not especially limited as far as the requirements specified in this invention are satisfied. For example, a method in which the (A) thermoplastic resin, the (B) polyfunctional compound having three or more functional groups, and, as required, other ingredients are homogeneously melt-kneaded at higher than the melting points using a single screw or twin-screw extruder, or a method in which the ingredients are mixed in a solution, followed by removing the solvent can be preferably used. In view of productivity, the method of homogeneously melt-kneading in a single screw or twin-screw extruder is preferred, and in view of obtaining a resin composition excellent in flowability and mechanical properties, a method of homogeneously melt-kneading in a twin-screw extruder is more preferred. Above all, a method of melt-kneading in a twin-screw extruder of L/D>30, where L denotes the length of each screw and D denotes the diameter of each screw, is especially preferred. The length of each screw in this case refers to the length from the position where the raw materials are supplied at the root of the screw to the tip of the screw. If L/D is larger, the effect of enhancing the flowability by the (B) compound having three or more functional groups is larger. The upper limit of L/D of the twin-screw extruder is 150, and preferably a twin-screw extruder with L/D of more than 30 to 100 can be used.

Further, as the screw constitution in the case where a twin-screw extruder is used, full flight screws and kneading discs are used in combination, and to obtain the composition, it is necessary to homogeneously knead using screws. For this reason, it is preferred that the rate of the total length of kneading discs (kneading zone) to the overall screw length is in a range from 5 to 50%. A more preferred range is 10 to 40%.

In the case where melt kneading is employed in this invention, with regard to the method for supplying the respective ingredients, for example, when an extruder with two supply ports is used, the (A) thermoplastic resin, the (B) polyfunctional compound having three or more functional groups and other ingredients selected as required can be supplied from the main supply port formed at the root side of the screws, or the (A) thermoplastic resin and other ingredients can be supplied from the main supply port while the (B) polyfunctional compound having three or more functional groups can be supplied from the sub supply port formed at an intermediate position between the main supply port and the tip of the extruder, for melt kneading. In view of the excellence in flowability, mechanical properties and production stability, it is preferred to supply the (A) thermoplastic resin and other ingredients from the main supply port while supplying the (B) polyfunctional compound having three or more functional groups from the sub supply port formed at an intermediate position between the main supply port and the tip of the extruder, for melt kneading. It is more preferred to continuously supply the (B) ingredient.

When the resin composition is produced, it is preferred in view of the excellence in flowability and mechanical properties that the melt kneading temperature is 110 to 360° C. A more preferred range is 210 to 320° C., and an especially preferred range is 240 to 280° C.

The resin composition can be molded by any publicly known arbitrary method such as injection molding, extrusion molding, blow molding, press molding or spinning, to obtain various molded articles. The molded articles can be used as injection molded articles, extruded articles, blow molded articles, films, sheets, fibers, etc. The films can be used as various films such as non-stretched films, monoaxially stretched films, biaxially stretched films, etc., and the fibers can be used as various fibers such as non-stretched yarns, stretched yarns, super-stretched yarns, etc. The excellent flowability can be used to obtain an injection molded article having a thin region with a thickness of 0.01 to 1.0 mm, and further to obtain a large-sized molded article requiring flowability and good appearance.

The abovementioned various molded articles can be used for various applications such as automobile parts, electric/electronic parts, architectural parts, various containers, daily necessities, miscellaneous goods and sanitary articles. The molded articles are especially suitable as connectors for automobiles and connectors for electric/electronic apparatuses.

Particular applications include automobile underhood parts such as air flow meters, air pumps, thermostat housings, engine mounts, ignition bobbins, ignition cases, clutch buttons, sensor housings, idle speed control valves, vacuum switching valves, ECU housings, vacuum pump cases, inhibitor switches, rotation sensors, acceleration sensors, distributor caps, coil bases, actuator cases for ABS, radiator tank tops and bottoms, cooling fans, fan shrouds, engine covers, cylinder head covers, oil caps, oil pans, oil filters, fuel caps, fuel strainers, distributor caps, vapor canister housings, air cleaner housings, timing belt covers, brake booster parts, various cases, various tubes, various tanks, various hoses, various clips, various valves and various pipes, automobile interior parts such as torque control levers, safety belt parts, register blades, washer levers, window regulator handles, window regulator handle knobs, passing light levers, sun visor brackets and various motor housings, automobile exterior parts such as roof rails, fenders, garnishes, bumpers, door mirror stays, spoilers, hood louvers, wheel covers, wheel caps, grill apron cover frames, lamp reflectors, lamp bezels and door handles, various automobile connectors such as wire harness connectors, SMJ connectors, PCB connectors and door grommet connectors, and electric/electronic parts typified by electric connectors, relay cases, coil bobbins, optical pickup chassis, motor cases, notebook type personal computer housings and internal parts, CRT display housings and internal parts, printer housings and internal parts, cell phones, mobile personal computers, handheld mobile and other portable terminal housings and internal parts, recording medium (CD, DVD, PD, FDD, etc.) drive housings and internal parts, copier housings and internal parts, facsimile housings and internal parts and parabolic antennas. Other applications include household and office electric appliance parts typified by VTR parts, TV parts, irons, hair dryers, rice cooker parts, electronic oven parts, acoustic parts, image apparatus parts of video cameras, projectors, etc., boards of optical recording media such as laser discs (registered trademark), compact discs (CD), CD-ROM, CD-R, CD-RW, DVD-ROM, DVD-R, DVD-RW, DVD-RAM and Blue-ray discs, illumination parts, refrigerator parts, air conditioner parts, typewriter parts and word processor parts. Further other applications include housings and internal parts of electronic musical instruments, home-use game machines, portable game machines, etc., electric/electronic parts such as various gears, various cases, sensors, LEP lamps, connectors, sockets, resistors, relay cases, switches, coil bobbins, capacitors, variable capacitor cases, optical pickups, oscillators, various terminal boards, transformers, plugs, printed wiring boards, tuners, speakers, microphones, headphones, small motors, magnetic head bases, power modules, semiconductors, liquid crystal, FDD carriages, FDD chassis, motor brush holders, transformer members and coil bobbins, sash door wheels, blind curtain parts, piping joints, curtain liners, blind parts, gas meter parts, water meter parts, water heater parts, architectural members such as roof panels, heat insulation walls, adjusters, floor posts, ceiling suspenders, stairways, doors and floors, fishery related articles such as fishing lines, fishing nets, seaweed culture nets and fish bait bags, civil engineering related articles such as vegetation nets, vegetation mats, weed growth prevention bags, weed growth prevention nets, protection sheets, slope protection sheets, ash scattering prevention sheets, drain sheets, water holding sheets, sludge dewatering bags and concrete forms, washroom articles such as face wash basins, hand wash basins, face wash counters, hand wash counters, accommodation cases, accommodation shelves, mirror frames, water faucet members, floors and walls, bathroom components such as bathtubs, bathtub covers, bathroom washing areas, bathroom walls, bathroom counters, bathroom floors, waterproof pans, bathroom accommodation shelves, bathroom ceilings, wash tubs, shower faucet members, washing area chairs and handrails, toilet components such as stools, stool covers, stool tops, toilet counters, washing nozzles and toilet accommodation shelves, kitchen components such as kitchen counters, kitchen sinks, kitchen sink walls, kitchen ceilings, accommodation shelves and accommodation shelf doors, etc., machine parts such as gears, screws, springs, bearings, levers, key stems, cams, ratchets, rollers, water supply parts, toy parts, fans, guts, pipes, washing tools, motor parts, microscopes, binoculars, cameras and time pieces, agricultural articles such as mulching films, tunnel films, bird sheets, vegetation protective nonwoven fabrics, seedling raising pots, vegetation piles, seed tapes, germination sheets, house lining sheets, agricultural PVC film fasteners, slow-acting fertilizers, root protection sheets, horticultural nets, insect nets, seedling tree nets, printed laminates, fertilizer bags, sample bags, sand bags, beast damage prevention nets, training ropes and windbreak nets, sanitary articles such as paper diapers, sanitary napkin packing materials, cotton swabs, rolled damp hand towels and stool top wiping paper sheets, medical articles such as medical nonwoven fabrics (suture region reinforcements, adhesion prevention films, artificial organ repairing materials), wound covers, wound bandages, plaster ground fabrics, surgery sutures, fracture reinforcements and medical films, packaging films of calendars, stationery, clothing, foods, etc., containers and tableware such as trays, blisters, knifes, forks, spoons, tubes, plastic cans, pouches, containers, tanks and baskets, containers and packages such as hot fill containers, containers for electronic oven cooking, cosmetics containers, wrapping sheets, foam cushioning materials, paper laminates, shampoo bottles, beverage bottles, cups, candy packs, shrinkable labels, cover materials, window envelopes, fruit baskets, tearable tapes, easy peel packages, egg packs, HDD packages, compost bags, recording medium packages, shopping bags and electric/electronic part wrapping films, composite materials containing natural fibers, various clothes such as polo shirts, T shirts, inners, uniforms, sweaters, socks & stockings and neckties, interior articles such as curtains, chair covering fabrics, carpets, table cloths, futon mattress wrapping fabrics, wallpapers and wrapping cloths, carrier tapes, printed laminates, heat sensitive stencil printing films, releasing films, porous films, container bags, credit cards, cash cards, ID cards, IC cards, paper, leather, hot melt binders of nonwoven fabrics, etc., binders of powders such as magnetic materials, zinc sulfide and electrode materials, optical elements, electrically conductive embossed tapes, IC trays, golf tees, refuse bags, various nets, tooth brushes, stationery, drain nets, body towels, hand towels, tea packs, drain ditch filters, clear files, coating materials, adhesives, briefcases, chairs, tables, cooler boxes, bamboo rakes, hose reels, planters, hose nozzles, dining tables, desk surfaces, furniture panels, kitchen cabinets, pen caps, gas lighters, etc. The molded articles are useful as various automobile connectors such as wire harness connectors, SMJ connectors, PCB connectors and door grommet connectors, and electric/electronic part connectors. Above all, the molded articles are especially useful as connectors with thinnest portions of 1 mm or less.

EXAMPLES

Our resin compositions and methods are described below in detail in reference to examples, but is not limited thereto or thereby.

Production Example 1

A reaction vessel with stirring blades, distillate pipe and cooling pipe was charged with 754 g of terephthalic acid and 491 g of 1,4-butanediol, and an ester interchange reaction was performed under the following reaction conditions.

Water was removed in nitrogen gas atmosphere at 120° C. for 0.5 hour, and subsequently 0.45 ml of tetrabutoxytitanium was added as a catalyst, to initiate an esterification reaction. The temperature was gradually raised from 135° C. to 240° C., while the pressure was kept at a reduced pressure of 650 mm Hg. Two hundred and thirty minutes after start of reaction, it was confirmed that the temperature at the top of the rectification tower declined, and the reaction was stopped. As a result, a theoretical amount of water was distilled out to obtain a low molecular weight polyester (G-1).

The obtained low molecular weight polyester (G-1) had a melting point of 222° C. and a weight average molecular weight of 880.

The symbols, names and other information of the main raw materials used in the working examples, etc. are shown below:

(A) Thermoplastic Resins
  a-1-1: Polybutylene terephthalate (melting point 223° C., "Toraycon" 1100S produced by Toray Industries, Inc.)
  a-1-2: Polypropylene terephthalate (melting point 228° C., "Corterra" CP509211 produced by Shell Chemicals)
  a-1-3: Polyethylene terephthalate (melting point 260° C., J155 produced by Mitsui Chemicals, Ltd.)
  a-1-4: Polycarbonate ("Toughlon" A1900 produced by Idemitsu Kosan Co., Ltd.)
  a-2-1: ABS resin ("Toyolac" T-100 produced by Toray Industries, Inc.)
  a-2-2: Acrylonitrile/styrene resin (Acrylonitrile/Styrene=25/75 produced by Toray Industries, Inc.)
  a-2-3: Styrene/butadiene resin ("Epofriend" AT501 produced by Daicel Chemical Industries, Ltd.)
  a-2-4: Polycyclohexanedimethylene terephthalate ("Easter" DN003 produced by Eastman Chemical)

(B) Polyfunctional Compounds Having Specific Terminal Structures and Three or More Functional Groups
  b-1: Polyoxyethylene diglycerol (molecular weight 410, 1.5 alkylene oxide (ethylene oxide) units per one functional group, SC-E450 produced by Sakamoto Yakuhin Kogyo Co., Ltd.)
  b-2: Polyoxyethylene trimethylolpropane (molecular weight 266, 1 alkylene oxide (ethylene oxide) unit per one functional group, TMP-30U produced by Nippon Nyukazai Co., Ltd.)
  b-3: Polyoxyethylene pentaerythritol (molecular weight 400, 1.5 alkylene oxide (ethylene oxide) units per one functional group, PNT-60U produced by Nippon Nyukazai Co., Ltd.)
  b-4: Polyoxypropylene diglycerol (molecular weight 750, 2.3 alkylene oxide (propylene oxide) units per one functional group, SC-P750 produced by Sakamoto Yakuhin Kogyo Co., Ltd.)
  b-5: Polyoxypropylene trimethylolpropane (molecular weight 308, 1 alkylene oxide (propylene oxide) unit per one functional group, TMP-F32 produced by Nippon Nyukazai Co., Ltd.)
  b-6: Polyoxypropylene pentaerythritol (molecular weight 452, 1 alkylene oxide (propylene oxide) unit per one functional group, PNT-F40 produced by Nippon Nyukazai Co., Ltd.)

(B') Polyfunctional Compounds Other Than (B)
  b'-1: 1,6-hexanediol (produced by Ardrich)
  b'-2: 4,4'-dihydroxybiphenyl (produced by Honshu Chemical Industry Co., Ltd.)
  b'-3: Glycerol (molecular weight 92, 0 alkylene oxide unit per one functional group, produced by Tokyo Chemical Industry Co., Ltd.)
  b'-4: Pentaerythritol (molecular weight 136, 0 alkylene oxide unit per one functional group, produced by Tokyo Chemical Industry Co., Ltd.)

(C) Terminal Blocking Agent Having Less than Three Functional Groups
  c-1: Versatic acid glycidyl ester (epoxy content 4.06 mol/kg, "Cardura" E10P produced by Japan Epoxy Resins Co., Ltd.)

(D) Ester Interchange Catalyst
  d-1: Dibutyltin oxide (produced by Tokyo Chemical Industry Co., Ltd.)

(E) Inorganic Fillers
  e-1: Chopped strand type glass fibers (fiber diameter 10 µm, cut length 3 mm, CS3J948 produced by Nitto Boseki Co., Ltd.)
  e-2: Chopped strand type glass fibers (fiber diameter 10 µm, T120H produced by Nippon Electric Glass Co., Ltd.)
  e-3: GFL (glass flakes, REFG101 produced by Nippon Sheet Glass Co., Ltd.)
  e-4: Chopped strand type glass fibers (fiber diameter 13 µm, 3PE949 produced by Nitto Boseki Co., Ltd.)
  e-5: Talc (P-6 produced by Nippon Talc Co., Ltd.)

(F) Impact Strength Improvers
  f-1: Ethylene/ethyl acrylate copolymer ("Evaflex" EEA A-709 produced by Du Pont-Mitsui Polychemicals Co., Ltd.)
  f-2: Ethylene/glycidyl methacrylate copolymer ("Bondfast" 2C produced by Sumitomo Chemical Co., Ltd.)
  f-3: Acrylic core shell elastomer ("Paraloid" EXL 2314 produced by Rohm & Haas)
  f-4: Butadiene-based core shell elastomer ("Paraloid" EXL2603 produced by Rohm & Haas)

(G) Low Molecular Weight Polyester
  g-1: Hydroxybutyl terephthalate (Production Example 1)

(H) Stabilizer
  h-1: Tetrakis[methylene-3-(3',5'-di-t-butyl-4'-hydroxyphenyl)propionate]methane ("Irganox" 1010 produced by Ciba Geigy)

(I) Releasing Agents
  i-1: Partially saponified montanic acid ester ("Licowax" OP produced by Clariant)
  i-2: Ethylenebisstearic acid amide ("Slipax" E produced by Nippon Kasei Chemical Co., Ltd.)

Further, the evaluation methods used in the working examples, etc. are described below.

(1) Flowability

Molded strips respectively with a thickness of 1 mm and a width of 10 mm were used for evaluation in reference to the flow length. The injection conditions were as follows:

Cylinder temperature 250° C., mold temperature 80° C. and injection pressure 30 MPa, when polybutylene terephthalate was used as the (A) thermoplastic resin, with no (E) inorganic filler contained Cylinder temperature 250° C., mold temperature 80° C. and injection pressure 70 MPa, when polybutylene terephthalate was used as the (A) thermoplastic resin, with (F) an inorganic filler contained Cylinder temperature 265° C., mold temperature 40° C. and injection pressure 30 MPa, when polypropylene terephthalate was used as the (A) thermoplastic resin Cylinder temperature 280° C., mold temperature 40° C. and injection pressure 30 MPa, when polyethylene terephthalate was used as the (A) thermoplastic resin Cylinder temperature 260° C., mold temperature 40° C. and injection pressure 80 MPa, when a polycarbonate was used as the (A) thermoplastic resin.

(2) Heat Resistance (DTUL)

Depending on the thermoplastic resin composition to be tested, either of the following methods was used selectively for measurement.

(2-1) The deflection temperature under load (load 1.82 MPa) of a molded strip of 12.7 mm×127 mm×3 mm was measured according to ASTM D648.

(2-2) The thermal deformation temperature at a load of 1.82 MPa was measured according to ISO75-1,2.

(3) Impact Resistance

Depending on the thermoplastic resin composition to be tested, either of the following methods was used selectively for measurement.

Figure 2:
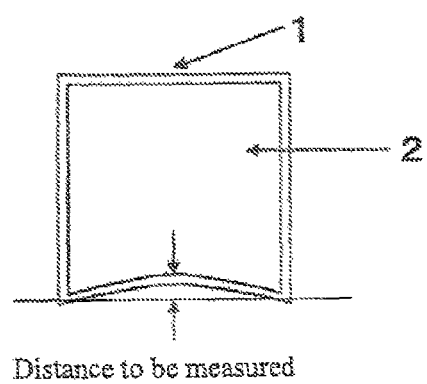
FIG. 2 is a bottom view of a specimen used for evaluating the low warping property in the examples.
Figure 3:
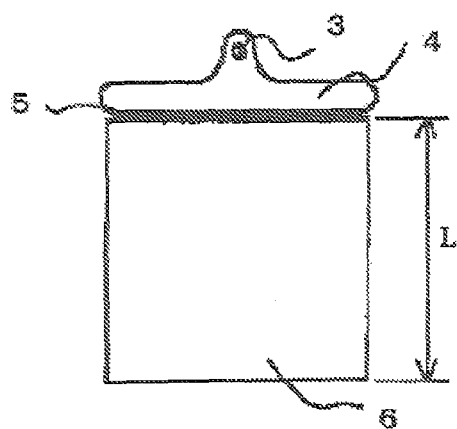
FIG. 3(a) is a plan view of a specimen for evaluating the laser beam transmittance used in the examples, and (b) is a side view of the specimen.
Figure 3:
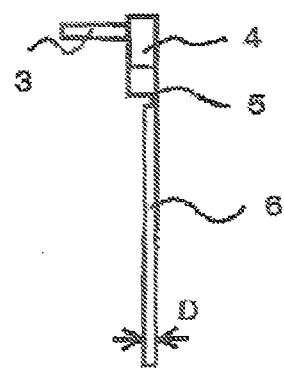
Figure 4:
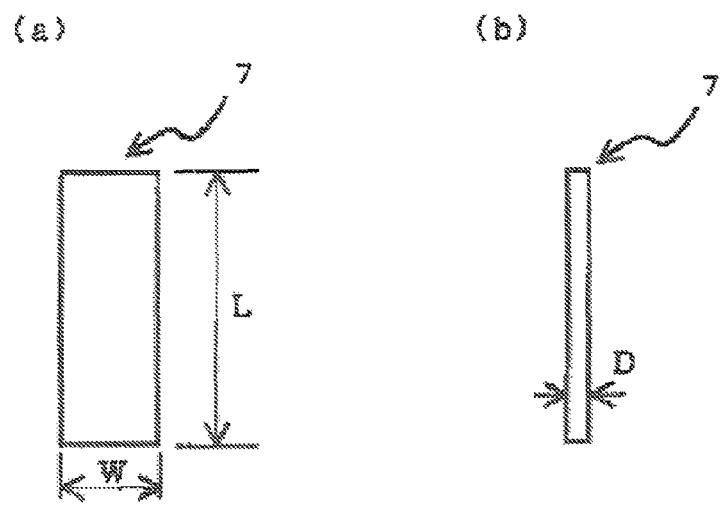
FIG. 4(a) is a plan view of a specimen for laser welding used in the examples, and (b) is a side view of the specimen.
Figure 5:
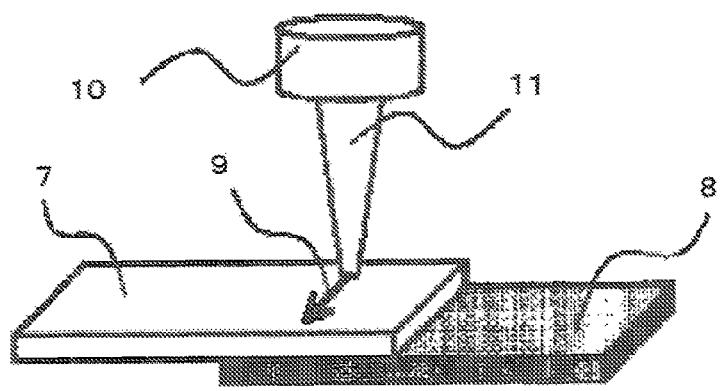
FIG. 5 is a schematic perspective view showing an outline of the laser welding method used for a laser welding test in the examples.

(3-1) The Izod impact strength of a molded article with a 3 mm thick notch was measured according to ASTM D256.
(3-2) A notched Charpy impact strength was measured according to ISO179.
(4) Bending Properties
Depending on the thermoplastic resin composition to be tested, either of the following methods was used selectively for measurement.
(4-1) The bending modulus of a molded strip of 12.7 mm×127 mm×3 mm was measured according to ASTM D790.
(4-2) The bending strength and the bending modulus were measured according to ISO178.
(5) Tensile Properties
Depending on the thermoplastic resin composition to be tested, either of the following methods was used selectively for measurement.
(5-1) The tensile yield strength and tensile break elongation of an ASTM Nos. 1 dumbbell specimen were measured according to ASTM D-638.
(5-2) The tensile strength and break elongation were measured according to ISO527-1,2.
(6) Hydrolysis Resistance
An ASTM No. 1 dumbbell specimen was allowed to stand in a pressure cooker tester at a temperature of 121° C. and at a relative humidity of 100% for 50 hours, and subsequently taken out, to measure the tensile yield strength according to the abovementioned method (5). The tensile strength holding rate was obtained from (Strength after hydrolysis treatment/Strength before hydrolysis treatment)×100 (%).
(7) Low Warping Property
A box-shaped specimen with an opening 1 shown in FIG. 1 was molded, and the inner warping distance on the counter-gate side as shown in FIG. 2 was measured.
(8) Laser Beam Transmittance
A laser beam transmittance evaluation square specimen 6 with a length L of 80 mm and a thickness D of 3 mm shown in FIG. 3 was molded. The molding conditions were cylinder temperature 260° C. and mold temperature 80° C. FIG. 3(a) is a plan view of the abovementioned laser beam transmittance evaluation specimen, and (b) is a side view of said specimen.
The molded pieces of a sprue 3 and a runner 4 shown in FIG. 3 were cut off at a gate position 5, to obtain the remaining portion as the laser beam transmittance evaluation specimen 6. The tester used was Ultraviolet/Near Infrared Spectrophotometer (UV-3100) produced by Shimadzu Corporation, and an integrating sphere was used as the detector. The transmittance expresses the ratio of the transmitted light quantity to the incident light quantity in percentage. In the tables of working examples and comparative examples, the light transmittance in a near infrared wavelength range from 800 to 1100 nm was stated as "Transmittance."
(9) Laser Weldability
As a laser weldability evaluation specimen, a molded article with the same shape as that of the laser transmittance evaluation specimen 6 of FIG. 3 was cut to have a width W of 24 mm and a length L of 70 mm, for obtaining a laser welding specimen 7.
FIG. 4(a) is a plan view showing the specimen 7 obtained after the abovementioned cutting, and (b) is a side view of the specimen. The laser welding machine used was Modulas C produced by Leister. The welding machine is an apparatus using a semiconductor laser, and the laser beam is a near infrared beam with a wavelength of 940 nm. The maximum output was 35 W, focal distance L, 38 mm, and focal diameter D, 0.6 nm.
FIG. 5 is a schematic drawing showing the method of laser welding. In the laser welding method, as shown in FIG. 5, a laser welding specimen 7 made of a material capable of transmitting a laser beam was placed above, and a laser welding specimen 8 made of a material capable of absorbing a laser beam was placed below the specimen 7 for overlapping. A laser beam was irradiated from above. The laser irradiation was performed along a laser welding track 9, and the laser welding was performed under such welding conditions as to obtain the highest welding strength with the output adjusted in a range from 15 to 35 W and the laser scanning speed adjusted in a range from 1 to 50 mm/sec. Meanwhile, the focal distance was fixed 38 mm, and the focal diameter was fixed at 0.6 mm.

The acceptability of laser welding was stated in the tables as "Welding acceptability," and a case where a melt mark was observed on the light incident surface of the laser beam transmitting specimen under the conditions of allowing laser welding was expressed as "Unacceptable," while a case where no melt mark was observed to allow welding was expressed as "Acceptable."

Figure 6:
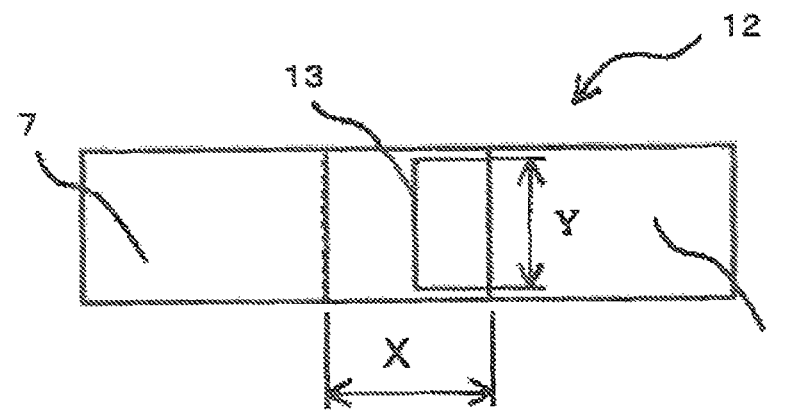
FIG. 6(a) is a plan view of the laser welding strength measuring specimens used after laser welding in the examples, and (b) is a side view of the specimen.
Figure 6:
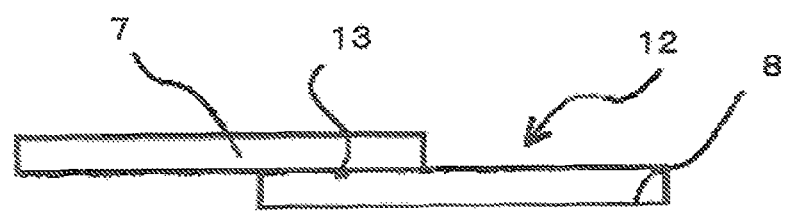

FIG. 6(a) is a plan view showing a laser welding strength measuring specimen 12 laser-welded by the abovementioned method, and (b) is a side view showing said specimen. The laser welding strength measuring specimen 12 was prepared by overlapping and welding the laser beam transmitting specimen 7 shown in FIG. 4 and the laser beam absorbing specimen 8 to each other at a weld zone 13 with an overlapping length X set at 30 mm and a welding distance Y set at 20 mm. For measuring the welding strength, a general tensile tester (AG-500B) was used to perform a tensile test, for generating a tensile shear stress at the weld region with both the ends of the laser welding strength measuring specimen 12 fixed. The stress rate for measuring the strength was 1 mm/min, and the span was 40 mm. The welding strength was the stress caused when the welding region was broken. The laser beam transmitting specimen 7 was made of the resin composition, and the laser beam absorbing specimen 8 was made of a material obtained by adding 30 wt % of glass fibers and further 0.4 wt % of carbon black to 70 wt % of polybutylene terephthalate resin.

Working Examples 1 to 25 and Comparative Examples 1 to 17

At each of the mixing ratios shown in Tables 1 to 3, (A) a thermoplastic resin, (B) a polyfunctional compound having specific terminal structures and three or more functional groups and other ingredients were mixed at a time and melt-kneaded using a twin-screw extruder of L/D=45 at a cylinder temperature of 250° C. and at a rotation speed of 200 rpm in the case where polybutylene terephthalate was used as the (A) thermoplastic resin, or at a cylinder temperature of 265° C. and at a rotation speed of 200 rpm in the case where polypropylene terephthalate was used as the (A) thermoplastic resin, or at a cylinder temperature of 280° C. and at a rotation speed of 200 rpm in the case where polyethylene terephthalate was used as the (A) thermoplastic resin, to obtain the corresponding resin composition as pellets.

The obtained resin composition was injection-molded to obtain molded articles for various evaluations using Injection Molding Machine SG75H-MIV produced by Sumitomo Heavy Industries, Ltd. at a cylinder temperature of 250° C. and at a mold temperature of 80° C. in the case where polybutylene terephthalate was used as the (A) thermoplastic resin, or at a cylinder temperature of 265° C. and at a mold temperature of 40° C. in the case where polypropylene terephthalate was used as the (A) thermoplastic resin, or at a cylinder temperature 280° C. and at a mold temperature of 40° C. in the case where polyethylene terephthalate was used as the (A) thermoplastic resin.

The evaluation results are shown in Tables 1 to 3.

TABLE 1

| | | | | Working Example | | | | | | |
|---|---|---|---|---|---|---|---|---|---|---|
| | | | | 1 | 2 | 3 | 4 | 5 | 6 | 7 |
| (A) ingredient | a-1-1 | | Parts by weight | 100 | 100 | 100 | 100 | 100 | 100 | 100 |
| | a-1-2 | | Parts by weight | | | | | | | |
| | a-1-3 | | Parts by weight | | | | | | | |
| (B) ingredient | b-1 | | Parts by weight | 0.5 | | | | | | |
| | b-2 | | Parts by weight | | 0.5 | 0.5 | 0.5 | 1 | 0.5 | 0.5 |
| | b-3 | | Parts by weight | | | | | | | |
| (C) ingredient | c-1 | | Parts by weight | | | 1 | | | 1 | 1 |
| (D) ingredient | d-1 | | Parts by weight | | | | 0.002 | 0.004 | 0.002 | 0.002 |
| (G) ingredient | g-1 | | Parts by weight | | | | | | | 4 |
| Flowability | Flow length | | mm | 115 | 104 | 116 | 127 | 140 | 148 | 159 |
| Heat resistance | DTUI | ASTM | °C. | 61 | 60 | 62 | 63 | 66 | 64 | 71 |
| Impact resistance | Izod impact value | ASTM | J/m | 32 | 31 | 35 | 31 | 27 | 31 | 27 |
| Blending properties | Bending modulus | ASTM | GPa | 2.6 | 2.7 | 2.7 | 2.6 | 2.6 | 2.7 | 2.7 |
| Tensile properties | Tensile strength | ASTM | MPa | 58 | 61 | 58 | 58 | 58 | 58 | 57 |

| | | | | Working Example | | | | | | | |
|---|---|---|---|---|---|---|---|---|---|---|---|
| | | | | 8 | 9 | 10 | 11 | 12 | 13 | 14 | 15 |
| (A) ingredient | a-1-1 | | Parts by weight | 100 | 100 | 100 | 100 | | | | |
| | a-1-2 | | Parts by weight | | | | | 100 | 100 | | |
| | a-1-3 | | Parts by weight | | | | | | | 100 | 100 |
| (B) ingredient | b-1 | | Parts by weight | | | | | | | | |
| | b-2 | | Parts by weight | | | | | | | | |
| | b-3 | | Parts by weight | 0.1 | 0.5 | 1 | 4 | 0.5 | 1 | 0.5 | 1 |
| (C) ingredient | c-1 | | Parts by weight | | | | | | | | |
| (D) ingredient | d-1 | | Parts by weight | | | | | | | | |
| (G) ingredient | g-1 | | Parts by weight | | | | | | | | |
| Flowability | Flow length | | mm | 90 | 98 | 114 | 147 | 95 | 117 | 90 | 107 |
| Heat resistance | DTUI | ASTM | °C. | 61 | 61 | 60 | 58 | 48 | 47 | 67 | 69 |
| Impact resistance | Izod impact value | ASTM | J/m | 33 | 31 | 30 | 27 | 35 | 35 | 31 | 31 |
| Blending properties | Bending modulus | ASTM | GPa | 2.6 | 2.6 | 2.7 | 2.5 | 2.6 | 2.4 | 2.5 | 2.7 |
| Tensile properties | Tensile strength | ASTM | MPa | 59 | 60 | 59 | 50 | 55 | 55 | 61 | 63 |

(A) Thermoplastic resins
a-1-1: Polybutylene terephthalate (melting point 223 C.°, "Toraycon" 1100S produced by Toray Industries, Inc.)
a-1-2: Polypropylene terephthalate (melting point 228 C.°, "Corterra" CP509211 produced by Shell Chemicals)
a-1-3: Polyethylene terephthalate (melting point 260 C.°, J155 produced by Mitsui Chemicals, Ltd.)
(B) Polyfunctional compounds having specific terminal structures and three or more functional groups
b-1: Polyoxyethylene diglycerol (molecular weight 410, 1.5 alkylene oxide units per one functional group, SC-E450 produced by Sakamoto Yakuhin Kogyo Co., Ltd.)
b-2: Polyoxyethylene trimethylolpropane (molecular weight 266, 1 alkylene oxide unit per one functional group, TMP-30U produced by Nippon Nyukazai Co., Ltd.)
b-3: Polyoxyethylene pentaerythritol (molecular weight 400, 1.5 alkylene oxide units per one functional group, PNT-60U produced by Nippon Nyukazai Co., Ltd.)
(C) Terminal blocking agent having less than three functional groups
c-1: Versatic acid glycidyl ester ("Cardura" E10P produced by Japan Epoxy Resins Co., Ltd.)
(D) Ester interchange catalyst
d-1: Dibutyltin oxide (Tokyo Chemical Industry Co., Ltd.)
(G) Low molecular weight polyester
g-1: Hydroxybutyl terephthalate (Production Example 1)

TABLE 2

| | | | | Comparative Example | | | | | | |
|---|---|---|---|---|---|---|---|---|---|---|
| | | | | 1 | 2 | 3 | 4 | 5 | 6 | 7 |
| (A) ingredient | a-1-1 | | parts by weight | 100 | 100 | 100 | 100 | 100 | 100 | 100 |
| | a-1-2 | | parts by weight | | | | | | | |
| | a-1-3 | | parts by weight | | | | | | | |
| (B) ingredient | b-1 | | parts by weight | | | | | | | |
| | b-2 | | parts by weight | | | | | | | |
| | b-3 | | parts by weight | | | | | | | |
| (B') ingredient | b'-1 | | parts by weight | | 0.5 | | | | | |
| | b'-2 | | parts by weight | | | 0.5 | | | | |
| | b'-3 | | parts by weight | | | | 0.1 | 0.5 | | |
| | b'-4 | | parts by weight | | | | | | 0.1 | 0.5 |
| (C) ingredient | c-1 | | parts by weight | | | | | | | |
| (D) ingredient | d-1 | | parts by weight | | | | | | | |
| (G) ingredient | g-1 | | parts by weight | | | | | | | |
| Flowability | Flow length | | mm | 78 | 82 | 80 | 80 | 87 | 81 | 88 |
| Heat resistance | DTUL | ASTM | °C. | 61 | 61 | 61 | 61 | 61 | 61 | 62 |
| Impact resistance | Izod impact value | ASTM | J/m | 34 | 31 | 34 | 33 | 32 | 33 | 32 |

TABLE 2-continued

| | | | | | | | | | | |
|---|---|---|---|---|---|---|---|---|---|---|
| Bending properties | Bending modulus | ASTM | GPa | 2.6 | 2.6 | 2.6 | 2.6 | 2.6 | 2.6 | 2.6 |
| Tensile properties | Tensile strength | ASTM | MPa | 59 | 56 | 56 | 58 | 58 | 58 | 56 |

| | | | | Comparative Example | | | | | | |
|---|---|---|---|---|---|---|---|---|---|---|
| | | | | 8 | 9 | 10 | 11 | 12 | 13 | 14 |
| (A) ingredient | a-1-1 | | parts by weight | 100 | 100 | 100 | | | | |
| | a-1-2 | | parts by weight | | | | 100 | 100 | | |
| | a-1-3 | | parts by weight | | | | | | 100 | 100 |
| (B) ingredient | b-1 | | parts by weight | | | | | | | |
| | b-2 | | parts by weight | | | | | | | |
| | b-3 | | parts by weight | 0.01 | 5 | 10 | | | | |
| (B') ingredient | b'-1 | | parts by weight | | | | | 0.5 | | 0.5 |
| | b'-2 | | parts by weight | | | | | | | |
| | b'-3 | | parts by weight | | | | | | | |
| | b'-4 | | parts by weight | | | | | | | |
| (C) ingredient | c-1 | | parts by weight | | | | | | | |
| (D) ingredient | d-1 | | parts by weight | | | | | | | |
| (G) ingredient | g-1 | | parts by weight | | | | | | | |
| Flowability | Flow length | | mm | 79 | 150 | 154 | 69 | 69 | 67 | 68 |
| Heat resistance | DTUL | ASTM | °C. | 61 | 60 | 65 | 50 | 51 | 69 | 68 |
| Impact resistance | Izod impact value | ASTM | J/m | 33 | 20 | 19 | 32 | 33 | 35 | 33 |
| Bending properties | Bending modulus | ASTM | GPa | 2.6 | 2.2 | 2.1 | 2.6 | 2.6 | 2.6 | 2.5 |
| Tensile properties | Tensile strength | ASTM | MPa | 59 | 47 | 45 | 58 | 54 | 61 | 59 |

(A) Thermoplastic resins
a-1-1: Polybutylene terephthalate (melting point 223° C., "Toraycon" 1100S produced by Toray Industries, Inc.)
a-1-2: Polypropylene terephthalate (melting point 228° C., "Corterra" CP509211 produced by Shell Chemicals)
a-1-3: Polyethylene terephthalate (melting point 260° C., J155 produced by Mitsui Chemicals, Ltd.)
(B) Polyfunctional compounds having specific terminal structures and three or more functional groups
b-1: Polyoxyethylene diglycerol (molecular weight 410, 1.5 alkylene oxide units per one functional group, SC-E450 produced by Sakamoto Yakuhin Kogyo Co., Ltd.)
b-2: Polyoxyethylene trimethylolpropane (molecular weight 266, 1 alkylene oxide unit per one functional group, TMP-30U produced by Nippon Nyukazai Co., Ltd.)
b-3: Polyoxyethylene pentaerythritol (molecular weight 400, 1.5 alkylene oxide units per one functional group, PNT-60U produced by Nippon Nyukazai Co., Ltd.)
(B') Polyfunctional compounds other than (B)
b'-1: 1,6-hexanediol (Ardrich)
b'-2: 4,4'-dihydroxybiphenyl (Honshu Chemical Industry Co., Ltd.)
b'-3: Glycerol (molecular weight 92, 0 alkylene oxide unit per one functional group, Tokyo Chemical Industry Co., Ltd.)
b'-4: Pentaerythritol (molecular weight 136, 0 alkylene oxide unit per one functional group, Tokyo Chemical Industry Co., Ltd.)
(C) Terminal blocking agent having less than three functional groups
c-1: Versatic acid glycidyl ester ("Cardura" E10P produced by Japan Epoxy Resins Co., Ltd.)
(D) Ester interchange catalyst
d-1: Dibutyltin oxide (Tokyo Chemical Industry Co., Ltd.)
(G) Low molecular weight polyester
g-1: Hydroxybutyl terephthalate (Production Example 1)

TABLE 3

| | | | | Working Example | | | | | |
|---|---|---|---|---|---|---|---|---|---|
| | | | | 16 | 17 | 18 | 19 | 20 | 21 |
| (A) ingredient | a-1-1 | | parts by weight | 100 | 100 | 100 | 100 | 100 | 100 |
| | a-1-2 | | parts by weight | | | | | | |
| | a-1-3 | | parts by weight | | | | | | |
| (B) ingredient | b-3 | | parts by weight | 0.3 | | | | | |
| | b-4 | | parts by weight | | 0.3 | | | | |
| | b-5 | | parts by weight | | | 0.1 | 0.3 | 0.3 | 0.3 |
| | b-6 | | parts by weight | | | | | | |
| (C) ingredient | c-1 | | parts by weight | | | | | | 1.4 |
| (D) ingredient | d-1 | | parts by weight | | | | | 0.002 | 0.002 |
| Flowability | Flow length | | mm | 94 | 94 | 89 | 93 | 103 | 110 |
| Heat resistance | DTUL | ASTM | °C. | 61 | 61 | 61 | 61 | 61 | 63 |
| Impact resistance | Izod impact value | ASTM | J/m | 32 | 33 | 34 | 33 | 33 | 33 |
| Bending properties | Bending modulus | ASTM | GPa | 2.6 | 2.6 | 2.6 | 2.6 | 2.6 | 2.7 |
| Tensile properties | Tensile strength | ASTM | MPa | 59 | 61 | 61 | 60 | 60 | 60 |
| | Break elongation | ASTM | % | 9 | 15 | 15 | 15 | 14 | 15 |
| Hydrolysis resistance | Tensile strength holding rate | | % | 39 | 44 | 43 | 45 | 41 | 76 |

TABLE 3-continued

|  |  |  |  | Working Example | | | | Comparative Example | | |
|---|---|---|---|---|---|---|---|---|---|---|
|  |  |  |  | 22 | 23 | 24 | 25 | 15 | 16 | 17 |
| (A) ingredient | a-1-1 |  | parts by weight | 100 | 100 | 100 | 100 | 100 | 100 | 100 |
|  | a-1-2 |  | parts by weight |  |  |  |  |  |  |  |
|  | a-1-3 |  | parts by weight |  |  |  |  |  |  |  |
| (B) ingredient | b-3 |  | parts by weight |  |  |  |  |  |  |  |
|  | b-4 |  | parts by weight |  |  |  |  |  |  |  |
|  | b-5 |  | parts by weight | 0.6 | 1 | 4 |  | 0.01 | 5 | 10 |
|  | b-6 |  | parts by weight |  |  |  | 0.3 |  |  |  |
| (C) ingredient | c-1 |  | parts by weight |  |  |  |  |  |  |  |
| (D) ingredient | d-1 |  | parts by weight |  |  |  |  |  |  |  |
| Flowability | Flow length |  | mm | 109 | 113 | 145 | 93 | 79 | 150 | 154 |
| Heat resistance | DTUL | ASTM | °C. | 62 | 60 | 59 | 63 | 61 | 60 | 65 |
| Impact resistance | Izod impact value | ASTM | J/m | 32 | 31 | 28 | 31 | 33 | 20 | 19 |
| Bending properties | Bending modulus | ASTM | GPa | 2.6 | 2.6 | 2.5 | 2.6 | 2.6 | 2.1 | 2.0 |
| Tensile properties | Tensile strength | ASTM | MPa | 58 | 55 | 50 | 61 | 59 | 45 | 43 |
|  | Break elongation | ASTM | % | 14 | 13 | 10 | 15 | 15 | 7 | 4 |
| Hydrolysis resistance | Tensile strength holding rate |  | % | 49 | 48 | 39 | 44 | 43 | 32 | 21 |

(A) Thermoplastic resins
a-1-1: Polybutylene terephthalate (melting point 223° C., "Toraycon" 1100S produced by Toray Industries, Inc.)
a-1-2: Polypropylene terephthalate (melting point 228° C., "Corterra" CP509211 produced by Shell Chemicals)
a-1-3: Polyethylene terephthalate (melting point 260° C., J155 produced by Mitsui Chemicals, Ltd.)
(B) Polyfunctional compounds having specific terminal structures and three or more functional groups
b-1: Polyoxyethylene diglycerol (molecular weight 410, 1.5 alkylene oxide units per one functional group, SC-E450 produced by Sakamoto Yakuhin Kogyo Co., Ltd.)
b-2: Oxyethylene trimethylolpropane (molecular weight 266, 1 alkylene oxide unit per one functional group, TMP-30U produced by Nippon Nyukazai Co., Ltd.)
b-3: Polyoxyethylene pentaerythritol (molecular weight 400, 1.5 alkylene oxide units per one functional group, PNT-60U produced by Nippon Nyukazai Co., Ltd.)
b-4: Polyoxypropylene diglycerol (molecular weight 750, 2.3 alkylene oxide units per one functional group, SC-P750 produced by Sakamoto Yakuhin Kogyo Co., Ltd.)
b-5: Polyoxypropylene trimethylolpropane (molecular weight 308, 1 alkylene oxide unit per one functional group, TMP-F32 produced by Nippon Nyukazai Co., Ltd.)
b-6: Polyoxypropylene pentaerythritol (molecular weight 452, 1 alkylene oxide unit per one functional group, PNT-F40 produced by Nippon Nyukazai Co., Ltd.)
(C) Terminal blocking agent having less than three functional groups
c-1: Versatic acid glycidyl ester ("Cardura" E10P produced by Japan Epoxy Resins Co., Ltd.)
(D) Ester interchange catalyst
d-1: Dibutyltin oxide (Tokyo Chemical Industry Co., Ltd.)

From the results of Tables 1 to 3, the following are evident.

From the comparison between the working examples and the comparative examples, it can be seen that the thermoplastic resin compositions respectively obtained by mixing 0.1 to 4 parts by weight of (B) a polyfunctional compound having specific terminal structures and three or more functional groups with 100 parts by weight of (A) a thermoplastic resin are excellent in flowability, mechanical properties and heat resistance. It can be seen that especially in the case where the (B) polyfunctional compound having specific terminal structures and three or more functional groups contains alkylene oxide units, the flowability enhancing effect is large, and that in the case where the (B) ingredient contains propylene oxide units, the hydrolysis resistance is also excellent. Further as shown in Working Examples 3 to 7, it can be seen that in the case where (C) a terminal blocking agent having less than three functional groups, (D) an ester interchange catalyst and (G) a low molecular weight polyester are mixed, the flowability is further enhanced.

Working Examples 26 to 30 and Comparative Examples 18 to 20

At each of the mixing ratios shown in Table 4, (A) a thermoplastic resin, (B) a polyfunctional compound having specific terminal structures and three or more functional groups and a further other ingredient are mixed at a time and melt-kneaded using a twin-screw extruder of L/D=45 at a cylinder temperature of 260° C. and at a rotation speed of 200 rpm, to obtain the corresponding resin composition as pellets.

The obtained resin composition was injection-molded using Injection Molding Machine SG75H-MIV produced by Sumitomo Heavy Industries, Ltd. at a cylinder temperature of 260° C. and at a mold temperature of 40° C., to obtain molded articles for various evaluations. The evaluation results are shown in Table 4.

TABLE 4

|  |  |  |  | Working Example | | | | | Comparative Example | | |
|---|---|---|---|---|---|---|---|---|---|---|---|
|  |  |  |  | 26 | 27 | 28 | 29 | 30 | 18 | 19 | 20 |
| (A) ingredient | a-1-4 |  | parts by weight | 100 | 100 | 100 | 100 | 100 | 100 | 100 | 100 |
| (B) ingredient | b-3 |  | parts by weight | 0.5 |  |  |  |  | 1 |  | 10 |
|  | b-4 |  | parts by weight |  | 0.5 |  |  |  |  |  |  |
|  | b-5 |  | parts by weight |  |  | 0.5 |  |  |  |  |  |
|  | b-6 |  | parts by weight |  |  |  | 0.5 |  |  |  |  |

TABLE 4-continued

|  |  |  | | Working Example | | | | | Comparative Example | | |
|---|---|---|---|---|---|---|---|---|---|---|---|
|  |  |  | | 26 | 27 | 28 | 29 | 30 | 18 | 19 | 20 |
| (B') ingredient | b'-1 | | parts by weight | | | | | | | 0.5 | |
| Flowability | Flow length | | mm | 63 | 63 | 62 | 63 | 80 | 50 | 55 | 96 |
| Heat resistance | DTUL | ASTM | ° C. | 121 | 121 | 121 | 123 | 119 | 125 | 123 | 114 |
| Impact resistance | Izod impact | ASTM | J/m | 852 | 860 | 865 | 850 | 786 | 822 | 811 | 262 |
| Bending properties | Bending modulus | ASTM | GPa | 2.5 | 2.5 | 2.5 | 2.5 | 2.5 | 2.4 | 2.4 | 2.4 |
| Tensile properties | Tensile strength | ASTM | MPa | 61 | 62 | 61 | 62 | 62 | 64 | 60 | 44 |

(A) Thermoplastic resins
a-1-4: Polycarbonate ("Toughlon" A1900 produced by Idemitsu Kosan Co., Ltd.)
(B) Polyfunctional compounds having specific terminal structures and three or more functional groups
b-3: Polyoxyethylene pentaerythritol (molecular weight 400, 1.5 alkylene oxide units per one functional group, PNT-60U produced by Nippon Nyukazai Co., Ltd.)
b-4: Polyoxypropylene diglycerol (molecular weight 750, 2.3 alkylene oxide units per one functional group, SC-P750 produced by Sakamoto Yakuhin Kogyo Co., Ltd.)
b-5: Polyoxypropylene trimethylolpropane (molecular weight 306, 1 alkylene oxide unit per one functional group, TMP-F32 produced by Nippon Nyukazai Co., Ltd.)
b-6: Polyoxypropylene pentaerythritol (molecular weight 452, 1 alkylene oxide unit per one functional group, PNT-F40 produced by Nippon Nyukazai Co., Ltd.)
(B') Polyfunctional compounds other than (B)
b'-1: 1,6-hexanediol (Ardrich)

From the results of Table 4, the following are evident.

From the comparison between the working examples and the comparative examples, it can be seen that the thermoplastic resin compositions respectively obtained by mixing 0.1 to 4 parts by weight of (B) a polyfunctional compound having specific terminal structures and three or more functional groups with 100 parts by weight of (A) a thermoplastic resin are excellent in flowability and mechanical properties.

Working Examples 31 to 40 and Comparative Examples 21 to 25

At each of the mixing ratios shown in Table 5, (A) a thermoplastic resin and (B) a polyfunctional compound having specific terminal structures and three or more functional groups were mixed at a time and supplied into a twin-screw extruder of L/D=45 at the root of the screws, and (E) an inorganic filler was fed into the extruder from a side feeder. Melt kneading was performed at a cylinder temperature of 250° C. and at a rotation speed of 200 rpm, to obtain the corresponding resin composition as pellets.

The obtained resin composition was injection-molded using Injection Molding Machine SG75H-MIV produced by Sumitomo Heavy Industries, Ltd. at a cylinder temperature of 250° C. and a mold temperature of 80° C., to obtain molded articles for various evaluations. The evaluation results are shown in Table 5.

TABLE 5

|  |  |  | | Working Example | | | | | | |
|---|---|---|---|---|---|---|---|---|---|---|
|  |  |  | | 31 | 32 | 33 | 34 | 35 | 36 | 37 |
| (A) ingredient | a-1-1 | | parts by weight | 100 | 100 | 100 | 100 | 100 | 100 | 100 |
| (B) ingredient | b-1 | | parts by weight | 0.7 | | | | | | |
|  | b-2 | | parts by weight | | 0.7 | 0.7 | 0.7 | 0.7 | | |
|  | b-3 | | parts by weight | | | | | | 0.7 | |
|  | b-4 | | parts by weight | | | | | | | 0.7 |
|  | b-5 | | parts by weight | | | | | | | |
|  | b-6 | | parts by weight | | | | | | | |
| (B') ingredient | b'-1 | | parts by weight | | | | | | | |
|  | b'-3 | | parts by weight | | | | | | | |
|  | b'-4 | | parts by weight | | | | | | | |
| (C ingredient | c-1 | | parts by weight | | | | 1.4 | 1.4 | 1.4 | |
| (D) ingredient | d-1 | | parts by weight | | | | | 0.003 | 0.003 | |
| (E) ingredient | e-1 | | parts by weight | 43 | 43 | 43 | 43 | 43 | 43 | 43 |
| (G) ingredient | g-1 | | parts by weight | | | | | 3 | | |
| Flowability | Flow length | | mm | 127 | 118 | 125 | 131 | 142 | 118 | 118 |
| Heat resistance | DTUL | ASTM | ° C. | 215 | 216 | 215 | 216 | 215 | 214 | 214 |
| Impact resistance | Izod impact value | ASTM | J/m | 94 | 95 | 100 | 98 | 96 | 93 | 95 |
| Bending properties | Bending modulus | ASTM | GPa | 9.1 | 9.3 | 9.1 | 9.2 | 9.1 | 9.2 | 9.2 |
| Tensile properties | Tensile strength | ASTM | MPa | 142 | 143 | 142 | 141 | 141 | 143 | 145 |
| Hydrolysis resistance | Tensile strength holding rate | | % | 58 | 55 | 79 | 75 | 71 | 51 | 60 |

|  |  |  | | Working Example | | | Comparative Example | | | | |
|---|---|---|---|---|---|---|---|---|---|---|---|
|  |  |  | | 38 | 39 | 40 | 21 | 22 | 23 | 24 | 25 |
| (A) ingredient | a-1-1 | | parts by weight | 100 | 100 | 100 | 100 | 100 | | 100 | 100 |
| (B) ingredient | b-1 | | parts by weight | | | | | | | | |
|  | b-2 | | parts by weight | | | | | | | | |
|  | b-3 | | parts by weight | | | | | 1.4 | | | 14 |
|  | b-4 | | parts by weight | | | | | | | | |
|  | b-5 | | parts by weight | 0.7 | | | | | | | |
|  | b-6 | | parts by weight | | 0.7 | | | | | | |

TABLE 5-continued

| | | | | | | | | | | | |
|---|---|---|---|---|---|---|---|---|---|---|---|
| (B') ingredient | b'-1 | parts by weight | | | | | | 0.7 | | |
| | b'-3 | parts by weight | | | | | | | 0.7 | |
| | b'-4 | parts by weight | | | | | | | | 0.7 |
| (C ingredient) | c-1 | parts by weight | | | | | | | | |
| (D) ingredient | d-1 | parts by weight | | | | | | | | |
| (E) ingredient | e-1 | parts by weight | 43 | 43 | 43 | 43 | 43 | 43 | 43 | 43 |
| (G) ingredient | g-1 | parts by weight | | | | | | | | |
| Flowability | Flow length | mm | 116 | 118 | 132 | 86 | 97 | 100 | 102 | 148 |
| Heat resistance | DTUL ASTM | ° C. | 214 | 215 | 215 | 214 | 215 | 216 | 214 | 210 |
| Impact resistance | Izod impact value ASTM | J/m | 95 | 91 | 93 | 95 | 88 | 92 | 96 | 66 |
| Bending properties | Bending modulus ASTM | GPa | 9.2 | 9.2 | 9.0 | 9.2 | 9.0 | 9.0 | 9.1 | 8.4 |
| Tensile properties | Tensile strength ASTM | MPa | 144 | 145 | 142 | 142 | 140 | 140 | 141 | 115 |
| Hydrolysis resistance | Tensile strength holding rate | % | 62 | 61 | 44 | 56 | 49 | 59 | 49 | 26 |

(A) Thermoplastic resins
a-1-1: Polybutylene terephthalate (melting point 223° C., "Toraycon" 1100S produced by Toray Industries Inc.)
a-1-2: Polypropylene terephthalate (melting point 228° C., "Corterra" CP509211 produced by Shell Chemicals)
a-1-3: Polyethylene terephthalate (melting point 260° C., J155 produced by Mitsui Chemicals, Ltd.)
(B) Polyfunctional compounds having specific terminal structures and three or more functional groups
b-1: Polyoxyethylene diglycerol (molecular weight 410, 1.5 alkylene oxide units per one functional group, SC-E450 produced by Sakamoto Yakuhin Kogyo Co., Ltd.)
b-2: Polyoxyethylene trimethylolpropane (molecular weight 266, 1 alkylene oxide unit per one functional group, TMP-30U produced by Nippon Nyukazai Co., Ltd.)
b-3: Polyoxyethylene pentaerythritol (molecular weight 400, 1.5 alkylene oxide units per one functional group, PNT-60U produced by Nippon Nyukazai Co., Ltd.)
b-4: Polyoxypropylene diglycerol (molecular weight 750, 2.3 alkylene oxide units per one functional group, SC-P750 produced by Sakamoto Yakuhin Kogyo Co., Ltd.)
b-5: Polyoxypropylene trimethylolpropane (molecular weight 308, 1 alkylene oxide unit per one functional group, TMP-F32 produced by Nippon Nyukazai Co., Ltd.)
b-6: Polyoxypropylene pentaerythritol (molecular weight 452, 1 alkylene oxide unit per one functional group, PNT-F40 produced by Nippon Nyukazai Co., Ltd.)
(B') Polyfunctional compounds other than (B)
b'-1: 1,6-hexanediol (Ardrich)
b'-2: 4,4'-dihydroxybiphenyl (Honshu Chemical Industry Co., Ltd.)
b'-3: Glycerol (molecular weight 92, 0 alkylene oxide unit per one functional group, Tokyo Chemical Industry Co., Ltd.)
b'-4: Pentaerythritol (molecular weight 136, 0 alkylene oxide unit per one functional group, Tokyo Chemical Industry Co., Ltd.)
(C) Terminal blocking agent having less than three functional groups
c-1: Versatic acid glyciyl ester ("Cardura" E10P produced by Japan Epoxy Resins Co., Ltd.)
(D) Ester interchange catalyst
d-1: Dibutyltin oxide (Tokyo Chemical Industry Co., Ltd.)
(E) Inorganic filler
e-1: Chopped strand type glass fibers (fiber diameter 10 ?m, cut length 3 mm, CS3J948 produced by Nitto Boseki Co., Ltd.)
(G) Low molecular weight polyester
g-1: Hydroxybutyl terephthalate (Production Example 1)

From the results of Table 5, the following are evident.

From the comparison between the working examples and the comparative examples, it can be seen that the resin compositions respectively obtained by mixing (A) a thermoplastic resin, (B) a polyfunctional compound having specific terminal structures and having three or more functional groups and (E) an inorganic filler are excellent in flowability, mechanical properties and heat resistance. It can be seen that especially in the case where the (B) polyfunctional compound having specific terminal structures and three or more functional groups contains alkylene oxide units, the flowability enhancing effect is large, and that in the case where the (B) ingredient contains propylene oxide units, the hydrolysis resistance is also excellent. Further, as shown in Working Examples 33 to 35, it can be seen that if (C) a terminal blocking agent having less than three functional groups, (D) an ester interchange catalyst and (G) a low molecular weight polyester are mixed, the flowability is further enhanced while the hydrolysis resistance is also excellent.

Working Examples 41 to 55 and Comparative Examples 26 and 27

At each of the mixing ratios shown in Table 6, (A) a thermoplastic resin, (B) a polyfunctional compound having specific terminal structures and three or more functional groups and other additives were mixed at a time and supplied into a twin-screw extruder of L/D=45 at the root of the screws, and (E) an inorganic filler was fed into the extruder from a side feeder. Melt kneading was performed at a cylinder temperature of 250° C. and at a rotation speed of 200 rpm, to obtain the corresponding resin composition as pellets.

The obtained resin composition was injection-molded using Injection Molding Machine SG75H-MIV produced by Sumitomo Heavy Industries, Ltd. at a cylinder temperature of 250° C. and at a mold temperature of 80° C., to obtain molded articles for various evaluations. The evaluation results are shown in Table 6.

TABLE 6

| | | | | Working Example | | | | | | | | |
|---|---|---|---|---|---|---|---|---|---|---|---|---|
| | | | | 41 | 42 | 43 | 44 | 45 | 46 | 47 | 48 | 49 |
| (A) ingredient | a-1-1 | parts by weight | | 100 | 100 | 100 | 100 | 100 | 100 | 100 | 100 | 100 |
| (B) ingredient | b-1 | parts by weight | | | | | | | | | | |
| | b-2 | parts by weight | | | | | | | | | | |
| | b-3 | parts by weight | | 0.7 | 0.7 | 2 | 0.7 | 0.7 | 0.7 | | | |
| | b-4 | parts by weight | | | | | | | | 0.7 | | |
| | b-5 | parts by weight | | | | | | | | | 0.7 | |
| | b-6 | parts by weight | | | | | | | | | | 0.7 |

TABLE 6-continued

| | | | | | | | | | | | | |
|---|---|---|---|---|---|---|---|---|---|---|---|---|
| (C) ingredient | c-1 | parts by weight | | | 0.5 | | | 0.5 | | | | |
| (E) ingredient | e-1 | parts by weight | 20 | 20 | 20 | 20 | 20 | 20 | 20 | 20 | 20 | |
| | e-5 | parts by weight | 0.1 | 0.1 | 0.1 | 0.1 | 0.1 | 0.1 | 0.1 | 0.1 | 0.1 | |
| (F) ingredient | f-1 | parts by weight | | | | 1 | 1 | 6 | 6 | 6 | 6 | |
| | f-2 | parts by weight | | | | | | | | | | |
| | f-3 | parts by weight | | | | | | | | | | |
| | f-4 | parts by weight | | | | | | | | | | |
| (H) ingredient | h-1 | parts by weight | 0.1 | 0.1 | 0.1 | 0.1 | 0.1 | 0.1 | 0.1 | 0.1 | 0.1 | |
| (I) ingredient | i-1 | parts by weight | 0.1 | 0.1 | 0.1 | 0.1 | 0.1 | 0.1 | 0.1 | 0.1 | 0.1 | |
| | i-2 | parts by weight | | | | | | | | | | |
| Flowability | Flow length | mm | 122 | 127 | 146 | 126 | 128 | 125 | 125 | 124 | 125 | |
| Heat resistance | DTUL | ASTM | °C. | 212 | 212 | 212 | 213 | 213 | 213 | 213 | 213 | 213 |
| Impact resistance | Izod impact value | ASTM | J/m | 57 | 59 | 57 | 57 | 58 | 60 | 60 | 60 | 60 |
| Bending properties | Bending modulus | ASTM | GPa | 5.6 | 5.6 | 5.4 | 5.4 | 5.4 | 5.2 | 5.2 | 5.2 | 5.2 |
| Tensile properties | Tensile strength | ASTM | MPa | 102 | 100 | 99 | 105 | 105 | 100 | 100 | 100 | 100 |
| | Break elongation | ASTM | % | 3 | 4 | 4 | 4 | 4 | 4 | 4 | 4 | 4 |
| Hydrolysis resistance | Tensile strength holding rate | % | 44 | 53 | 38 | 44 | 50 | 45 | 51 | 53 | 52 | |

| | | | | Working Example | | | | | | Comp. Examples | |
|---|---|---|---|---|---|---|---|---|---|---|---|
| | | | | 50 | 51 | 52 | 53 | 54 | 55 | 26 | 27 |
| (A) ingredient | a-1-1 | parts by weight | 100 | 100 | 100 | 100 | 100 | 100 | 100 | 100 |
| (B) ingredient | b-1 | parts by weight | | | | | | | | |
| | b-2 | parts by weight | | | | | | | | |
| | b-3 | parts by weight | 0.7 | | | | | | | |
| | b-4 | parts by weight | | 0.7 | | | | | | |
| | b-5 | parts by weight | | | 0.7 | | | | | |
| | b-6 | parts by weight | | | | 0.7 | 0.7 | 0.7 | | |
| (C) ingredient | c-1 | parts by weight | | | | | | | | |
| (E) ingredient | e-1 | parts by weight | 20 | 20 | 20 | 20 | 20 | 20 | 20 | 20 |
| | e-5 | parts by weight | 0.1 | 0.1 | 0.1 | 0.1 | 0.1 | 0.1 | 0.1 | 0.1 |
| (F) ingredient | f-1 | parts by weight | | | | | | | | |
| | f-2 | parts by weight | 15 | 15 | 15 | 15 | | | | 15 |
| | f-3 | parts by weight | | | | | 10 | | | |
| | f-4 | parts by weight | | | | | | 10 | | |
| (H) ingredient | h-1 | parts by weight | 0.1 | 0.1 | 0.1 | 0.1 | 0.1 | 0.1 | 0.1 | 0.1 |
| (I) ingredient | i-1 | parts by weight | | | | | 0.1 | 0.1 | 0.1 | |
| | i-2 | parts by weight | 0.1 | 0.1 | 0.1 | 0.1 | | | | 0.1 |
| Flowability | Flow length | mm | 100 | 100 | 99 | 100 | 98 | 110 | 85 | 76 |
| Heat resistance | DTUL | ASTM | °C. | 208 | 208 | 208 | 208 | 207 | 208 | 210 | 207 |
| Impact resistance | Izod impact value | ASTM | J/m | 92 | 92 | 92 | 92 | 75 | 63 | 52 | 94 |
| Bending properties | Bending modulus | ASTM | GPa | 5.2 | 4.5 | 4.5 | 4.5 | 4.0 | 4.1 | 5.6 | 4.5 |
| Tensile properties | Tensile strength | ASTM | MPa | 96 | 96 | 96 | 96 | 95 | 95 | 105 | 98 |
| | Break elongation | ASTM | % | 5 | 5 | 5 | 5 | 4 | 4 | 4 | 5 |
| Hydrolysis resistance | Tensile strength holding rate | % | 47 | 51 | 52 | 52 | 51 | 50 | 48 | 51 |

(A) Thermoplastic resins
a-1-1: Polybutylene terephthalate (melting point 223° C., "Toraycon" 1100S produced by Toray Industries, Inc.)
a-1-2: Polypropylene terephthalate (melting point 228° C., "Corterra" CP509211 produced by Shell Chemicals)
a-1-3: Polyethylene terephthalate (melting point 260° C., J155 produced by Mitsui Chemicals, Ltd.)
(B) Polyfunctional compounds having specific terminal structures and three or more functional groups
b-1: Polyoxyethylene diglycerol (molecular weight 410, 1.5 alkylene oxide units per one functional group, SC-E450 produced by Sakamoto Yakuhin Kogyo Co., Ltd.)
b-2: Polyoxyethylene trimethylolpropane (molecular weight 266, 1 alkylene oxide units per one functional group, TMP-30U produced by Nippon Nyukazai Co., Ltd.)
b-3: Polyoxyethylene pentaerythritol (molecular weight 400, 1.5 alkylene oxide units per one functional group, PNT-60U produced by Nippon Nyukazai Co., Ltd.)
b-4: Polyoxypropylene diglycerol (molecular weight 750, 2.3 alkylene oxide units per one functional group, SC-P750 produced by Sakamoto Yakuhin Kogyo Co., Ltd.)
b-5: Polyoxypropylene trimethylolpropane (molecular weight 308, 1 alkylene oxide unit per one functional group, TMP-F32 produced by Nippon Nyukazai Co., Ltd.)
b-6: Polyoxypropylene pentaerythritol (molecular weight 452, 1 alkylene oxide unit per one functional group, PNT-F40 produced by Nippon Nyukazai Co., Ltd.)
(C) Terminal blocking agent having less than three functional groups
c-1: Versatic acid glycidyl ester ("Cardura" E10P produced by Japan Epoxy Resins Co., Ltd.)
(E) Inorganic filler
e-1: Chopped strand type glass fibers (fiber diameter 10 ?m, cut length 3 mm, CS3J948 produced by Nitto Boseki Co., Ltd.)
e-5: Talc (P-6 produced by Nippon Talc Co., Ltd.)
(F) Impact strength modifiers
f-1: Ethylene/ethyl acrylate copolymer ("Evaflex" EEA A-709 produced by DuPont-Mitsui Polychemicals Co., Ltd.)
f-2: Ethylene/glycidyl methacrylate copolymer ("Bondfast" 2C produced by Sumitomo Chemical Co., Ltd.)
f-3: Acrylic core shell elastomer "Paraloid" EXL2314 produced by Rohm & Haas)
f-4: Butadiene-based core shell elastomer ("Paraloid" EXL2603 produced by Rohm & Haas)
(H) Stabilizer
h-1: Tetrakis[methylene-3-(3',5'-di-t-butyl-4'-hydroxyphenyl)propionate]methane ("Irganox" 1010 produced by Ciba Geigy)
(I) Releasing agents
i-1: Partially saponified montanic acid ester ("Licowax" OP produced by Clariant)
i-2: Ethylenebisstearic acid amide ("Slipax" E produced by Nippon Kasei Chemical Co., Ltd.)

From the results of Table 6, the following are evident.

From the comparison between the working examples and the comparative examples, it can be seen that the resin compositions respectively obtained by mixing (A) a thermoplastic resin, (B) a polyfunctional compound having specific terminal structures and three or more functional groups and (E) an inorganic filler are excellent in flowability, mechanical properties and heat resistance. It can be seen that especially in the case where the (B) polyfunctional compound having specific terminal structures and three or more functional groups contains alkylene oxide units, the flowability enhancing effect is large, and that in the case where the (B) ingredient contains propylene oxide units, the hydrolysis resistance is also excellent.

Working Examples 56 to 76 and Comparative Examples 28 to 38

At each of the mixing ratios shown in Tables 7 to 9, (A) thermoplastic resins, (B) a polyfunctional compound having specific terminal structures and three or more functional groups and other ingredients were mixed at a time and melt-kneaded using a twin-screw extruder of L/D=45 at a cylinder temperature of 250° C. and at a rotation speed of 200 rpm in the case where polybutylene terephthalate was used as one of the (A) thermoplastic resins, or at a cylinder temperature of 265° C. and at a rotation speed of 200 rpm in the case where polypropylene terephthalate was used as one of the (A) thermoplastic resins, or at a cylinder temperature of 280° C. and at a rotation speed of 200 rpm in the case where polyethylene terephthalate was used as one of the (A) thermoplastic resins, or at a cylinder temperature of 260° C. and at a rotation speed of 200 rpm in the case where a polycarbonate was used as one of the (A) thermoplastic resins, to obtain the corresponding resin composition as pellets.

The obtained resin composition was injection molded using Injection Molding Machine SG75H-MIV produced by Sumitomo Heavy Industries, Ltd. at a cylinder temperature of 250° C. and at a mold temperature of 80° C. in the case where polybutylene terephthalate was used as one of the (A) thermoplastic resins, or at a cylinder temperature of 265° C. and at a mold temperature of 40° C. in the case where polypropylene terephthalate was used as one of the (A) thermoplastic resins, or at a cylinder temperature of 280° C. and at a mold temperature of 40° C. in the case where polyethylene terephthalate was used as one of the (A) thermoplastic resins, or at a cylinder temperature of 260° C. and at a mold temperature of 80° C. in the case where a polycarbonate was used as one of the (A) thermoplastic resins, to obtain molded articles for various evaluations. The evaluation results are shown in Tables 7 to 9.

TABLE 7

| | | | | Working Example | | | | | | | | |
|---|---|---|---|---|---|---|---|---|---|---|---|---|
| | | | | 56 | 57 | 58 | 59 | 60 | 61 | 62 | 63 | 64 |
| (A-1) ingredient | a-1-1 | | parts by weight | 92 | 83 | 66 | 50 | 83 | 83 | 83 | 83 | 83 |
| | a-1-2 | | parts by weight | | | | | | | | | |
| | a-1-3 | | parts by weight | | | | | | | | | |
| | a-1-4 | | parts by weight | | | | | | | | | |
| (A-2) ingredient | a-2-1 | | parts by weight | | | | | | | | | |
| | a-2-2 | | parts by weight | 8 | 17 | 34 | 50 | 17 | 17 | 17 | 17 | 17 |
| | a-2-3 | | parts by weight | | | | | | | | | |
| (B) ingredient | b-1 | | parts by weight | | | | | | | | | |
| | b-2 | | parts by weight | | | | | | | | | |
| | b-3 | | parts by weight | 0.5 | 0.5 | 0.5 | 0.5 | 0.2 | 1 | 2 | 3.5 | 4.5 |
| (B') ingredient | b'-1 | | parts by weight | | | | | | | | | |
| | b'-2 | | parts by weight | | | | | | | | | |
| | b'-3 | | parts by weight | | | | | | | | | |
| (E) ingredient | e-2 | | parts by weight | 67 | 67 | 67 | 67 | 67 | 67 | 67 | 67 | 67 |
| | e-3 | | parts by weight | | | | | | | | | |
| (F) ingredient | f-1 | | parts by weight | | | | | | | | | |
| Flowability | Flow length | | mm | 115 | 114 | 114 | 115 | 104 | 130 | 150 | 170 | 190 |
| Heat resistance | DTUL | ISO | ° C. | 214 | 209 | 195 | 170 | 208 | 209 | 210 | 209 | 208 |
| Impact resistance | Notched Charpy impact | ISO | kJ/m2 | 12 | 12 | 12 | 11 | 12 | 12 | 12 | 12 | 11 |
| Bending properties | Bending strength | ISO | MPa | 244 | 245 | 233 | 224 | 244 | 240 | 238 | 235 | 230 |
| | Bending modulus | ISO | GPa | 12.5 | 12.6 | 12.7 | 10.1 | 12.4 | 12.5 | 12.4 | 12.6 | 12.2 |
| Tensile properties | Tensile strength | ISO | MPa | 166 | 167 | 165 | 153 | 168 | 165 | 162 | 160 | 155 |
| | Break elongation | ISO | % | 2 | 2 | 2 | 2 | 2 | 2 | 2 | 2 | 2 |

TABLE 7-continued

|  |  |  | Working Example | | | | | | | | |
|---|---|---|---|---|---|---|---|---|---|---|---|
|  |  |  | 56 | 57 | 58 | 59 | 60 | 61 | 62 | 63 | 64 |
| Low warping property | Warping distance | mm | 0.37 | 0.34 | 0.26 | 0.24 | 0.35 | 0.35 | 0.34 | 0.35 | 0.35 |

(A) Thermoplastic resins
a-1-1: Polybutylene terephthalate (melting point 223° C., "Toraycon" 1100S produced by Toray Industries, Inc.)
a-1-2: Polypropylene terephthalate (melting point 228° C., "Corterra" CP509211 produced by Shell Chemicals)
a-1-3: Polyethylene terephthalate (melting point 260° C., J155 produced by Mitsui Chemicals, Ltd.)
a-1-4: Polycarbonate ("Toughlon" A1900 produced by Idemitsu Kosan Co., Ltd.)
a-2-1: ABS resin ("Toyolac" T-100 produced by Toray Industries, Inc.)
a-2-2: Acrylonitrile/styrene resin (Acrylonitrile/Styrene = 25/75 produced by Toray Industries, Inc.)
a-2-3: Styrene/butadiene resin ("Epofriend" AT501 produced by Daicel Chemical Industries, Ltd.)
(B) Polyfunctional compounds having specific terminal structures and three or more functional groups
b-1: Polyoxyethylene diglycerol (molecular weight 410, 1.5 alkylene oxide units per one functional group, SC-E450 produced by Sakamoto Yakuhin Kogyo Co., Ltd.)
b-2: Polyoxyethylene trimethylolpropane (molecular weight 266, 1 alkylene oxide unit per one functional group, TMP-30U produced by Nippon Nyukazai Co., Ltd.)
b-3: Polyoxyethylene pentaerythritol (molecular weight 400, 1.5 alkylene oxide units per one functional group, PNT-60U produced by Nippon Nyukazai Co., Ltd.)
(B') Polyfunctional compounds other than (B)
b'-1: 1,6-hexanediol (Ardrich)
b'-2: 4,4'-dihydroxybiphenyl (Honshu Chemical Industry Co., Ltd.)
b'-3: Glycerol (molecular weight 92, 0 alkylene oxide unit per one functional group, Tokyo Chemical Industry Co., Ltd.)
(E) Inorganic filler
e-2: Chopped strand type glass fibers (fiber diameter 10 μm, T120H produced by Nippon Electric Glass Co., Ltd.)
e-3:
(F) Impact strength modifiers
f-1: Ethylene/ethyl acrylate copolymer ("Evaflex" EEA A-709 produced by Du Pont-Mitsui Polychemicals Co., Ltd.)

TABLE 8

|  |  |  | Working Example | | | | | |
|---|---|---|---|---|---|---|---|---|
|  |  |  | 65 | 66 | 67 | 68 | 69 | 70 |
| (A-1) ingredient | a-1-1 | parts by weight | 83 | 83 |  |  |  | 83 |
|  | a-1-2 | parts by weight |  |  | 83 |  |  |  |
|  | a-1-3 | parts by weight |  |  |  | 83 |  |  |
|  | a-1-4 | parts by weight |  |  |  |  | 83 |  |
| (A-2) ingredient | a-2-1 | parts by weight |  |  |  |  |  | 17 |
|  | a-2-2 | parts by weight | 17 | 17 | 17 | 17 | 17 |  |
|  | a-2-3 | parts by weight |  |  |  |  |  |  |
| (B) ingredient | b-1 | parts by weight | 0.5 |  |  |  |  |  |
|  | b-2 | parts by weight |  | 0.5 |  |  |  |  |
|  | b-3 | parts by weight |  |  | 0.5 | 0.5 | 0.5 | 0.5 |
| (B') ingredient | b'-1 | parts by weight |  |  |  |  |  |  |
|  | b'-2 | parts by weight |  |  |  |  |  |  |
|  | b'-3 | parts by weight |  |  |  |  |  |  |
| (E) ingredient | e-2 | parts by weight | 67 | 67 | 67 | 67 | 67 | 67 |
|  | e-3 | parts by weight |  |  |  |  |  |  |
| (F) ingredient | f-1 | parts by weight |  |  |  |  |  |  |
| Flowability | Flow length | mm | 112 | 115 | 114 | 112 | 110 | 114 |
| Heat resistance | DTUL | ISO ° C. | 210 | 209 | 233 | 240 | 146 | 208 |
| Impact resistance | Notched Charpy impact | ISO kJ/m2 | 11 | 12 | 12 | 11 | 20 | 12 |
| Bending properties | Bending strength | ISO MPa | 245 | 244 | 221 | 211 | 226 | 242 |
|  | Bending modulus | ISO GPa | 12.4 | 12.3 | 12.5 | 11.2 | 10.8 | 12.1 |
| Tensile properties | Tensile strength | ISO MPa | 167 | 169 | 169 | 152 | 139 | 164 |
|  | Break elongation | ISO % | 2 | 2 | 2 | 2 | 2 | 2 |
| Low warping property | Warping distance | mm | 0.34 | 0.35 | 0.33 | 0.31 | 0.27 | 0.34 |

|  |  |  | Working Example | | | | | |
|---|---|---|---|---|---|---|---|---|
|  |  |  | 71 | 72 | 73 | 74 | 75 | 76 |
| (A-1) ingredient | a-1-1 | parts by weight | 83 | 83 | 83 | 66 | 70 | 55 |
|  | a-1-2 | parts by weight |  |  |  |  |  |  |
|  | a-1-3 | parts by weight |  |  |  |  |  |  |
|  | a-1-4 | parts by weight |  |  |  |  | 20 |  |
| (A-2) ingredient | a-2-1 | parts by weight |  |  |  |  |  |  |
|  | a-2-2 | parts by weight | 17 | 17 | 17 | 17 |  | 45 |
|  | a-2-3 | parts by weight |  |  |  | 17 | 10 |  |
| (B) ingredient | b-1 | parts by weight |  |  |  |  |  |  |
|  | b-2 | parts by weight |  |  |  |  |  |  |
|  | b-3 | parts by weight | 0.5 | 0.5 | 0.5 | 0.5 | 0.5 | 0.5 |
| (B') ingredient | b'-1 | parts by weight |  |  |  |  |  |  |
|  | b'-2 | parts by weight |  |  |  |  |  |  |
|  | b'-3 | parts by weight |  |  |  |  |  |  |

TABLE 8-continued

| | | | | | | | | | |
|---|---|---|---|---|---|---|---|---|---|
| (E) ingredient | e-2 | | parts by weight | 20 | 43 | 100 | 34 | 43 | 43 |
| | e-3 | | parts by weight | | | | 33 | | |
| (F) ingredient | f-1 | | parts by weight | | | | | | 7 |
| Flowability | Flow length | | mm | 159 | 120 | 109 | 110 | 116 | 117 |
| Heat resistance | DTUL | ISO | °C. | 195 | 206 | 213 | 190 | 190 | 165 |
| Impact resistance | Notched Charpy impact | ISO | kJ/m2 | 5 | 10 | 9 | 9 | 13 | 11 |
| Bending properties | Bending strength | ISO | MPa | 170 | 220 | 223 | 170 | 211 | 166 |
| | Bending modulus | ISO | GPa | 5.6 | 9.6 | 12.6 | 9.9 | 9.0 | 8.1 |
| Tensile properties | Tensile strength | ISO | MPa | 100 | 145 | 170 | 102 | 139 | 132 |
| | Break elongation | ISO | % | 6 | 2 | 2 | 3 | 3 | 2 |
| Low warping property | Warping distance | | mm | 0.37 | 0.36 | 0.36 | 0.28 | 0.31 | 0.24 |

(A) Thermoplastic resins
a-1-1: Polybutylene terephthalate (melting point 223° C., "Toraycon" 1100S produced by Toray Industries, Inc.)
a-1-2: Polypropylene terephthalate (melting point 228° C., "Corterra" CP509211 produced by Shell Chemicals)
a-1-3: Polyethylene terephthalate (melting point 260° C., J155 produced by Mitsui Chemicals, Ltd.)
a-1-4: Polycarbonate ("Toughlon" A1900 produced by Idemitsu Kosan Co., Ltd.)
a-2-1: ABS resin ("Toyolac" T-100 produced by Toray Industries, Inc.)
a-2-2: Acrylonitrile/styrene resin (Acrylonitrile/Styrene = 25/75 produced by Toray Industries, Inc.)
a-2-3: Styrene/butadiene resin ("Epofriend" AT501 produced by Daicel Chemical Industries, Ltd.)
(B) Polyfunctional compounds having specific terminal structures and three or more functional groups
b-1: Polyoxyethylene diglycerol (molecular weight 410, 1.5 alkylene oxide units per one functional group, SC-E450 produced by Sakamoto Yakuhin Kogyo Co., Ltd.)
b-2: Polyoxyethylene trimethylolpropane (molecular weight 266, 1 alkylene oxide unit per one functional group, TMP-30U produced by Nippon Nyukazai Co., Ltd.)
b-3: Polyoxyethylene pentaerythritol (molecular weight 400, 1.5 alkylene oxide units per one functional group, PNT-60U produced by Nippon Nyukazai Co., Ltd.)
(B') Polyfunctional compounds other than (B)
b'-1: 1,6-hexanediol (Ardrich)
b'-2: 4,4'-dihydroxybiphenyl (Honshu Chemical Industry Co., Ltd.)
b'-3: Glycerol (molecular weight 92, 0 alkylene oxide unit per one functional group, Tokyo Chemical Industry Co., Ltd.)
(E) Inorganic filler
e-2: Chopped strand type glass fibers (fiber diameter 10 μm, T120H produced by Nippon Electric Glass Co., Ltd.)
e-3:
(F) Impact strength modifiers
f-1: Ethylene/ethyl acrylate copolymer ("Evaflex" EEA A-709 produced by Du Pont-Mitsui Polychemicals Co., Ltd.)

TABLE 9

| | | | | Comparative Example | | | | | |
|---|---|---|---|---|---|---|---|---|---|
| | | | | 28 | 29 | 30 | 31 | 32 | 33 |
| (A-1) ingredient | a-1-1 | | parts by weight | 100 | 40 | 83 | | | |
| | a-1-2 | | parts by weight | | | | 83 | | |
| | a-1-3 | | parts by weight | | | | | 83 | |
| | a-1-4 | | parts by weight | | | | | | 83 |
| (A-2) ingredient | a-2-1 | | parts by weight | | | | | | |
| | a-2-2 | | parts by weight | | 60 | 17 | 17 | 17 | 17 |
| | a-2-3 | | parts by weight | | | | | | |
| (B) ingredient | b-1 | | parts by weight | | | | | | |
| | b-2 | | parts by weight | | | | | | |
| | b-3 | | parts by weight | | | | | | |
| (B') ingredient | b'-1 | | parts by weight | 0.5 | 0.5 | | | | |
| | b'-2 | | parts by weight | | | | | | |
| | b'-3 | | parts by weight | | | | | | |
| (E) ingredient | e-2 | | parts by weight | 67 | 67 | 67 | 67 | 67 | 67 |
| | e-3 | | parts by weight | | | | | | |
| (F) ingredient | f-1 | | parts by weight | | | | | | |
| Flowability | Flow length | | mm | 91 | 93 | 90 | 89 | 91 | 85 |
| Heat resistance | DTUL | ISO | °C. | 215 | 140 | 209 | 232 | 241 | 144 |
| Impact resistance | Notched Charpy | ISO | kJ/m2 | 12 | 11 | 11 | 11 | 12 | 12 |
| Bending properties | Bending | ISO | MPa | 251 | 225 | 246 | 221 | 211 | 225 |
| | Bending | ISO | GPa | 12.2 | 10.0 | 12.4 | 12.3 | 11.1 | 10.8 |
| Tensile properties | Tensile | ISO | MPa | 168 | 149 | 167 | 166 | 155 | 139 |
| | Break | ISO | % | 2 | 2 | 2 | 2 | 2 | 2 |
| Low warping property | Warping | | mm | 0.41 | 0.22 | 0.36 | 0.33 | 0.31 | 0.26 |

| | | | | Comparative Example | | | | |
|---|---|---|---|---|---|---|---|---|
| | | | | 34 | 35 | 36 | 37 | 38 |
| (A-1) ingredient | a-1-1 | | parts by weight | 83 | 83 | 83 | 83 | 83 |
| | a-1-2 | | parts by weight | | | | | |
| | a-1-3 | | parts by weight | | | | | |
| | a-1-4 | | parts by weight | | | | | |
| (A-2) ingredient | a-2-1 | | parts by weight | | | | | |
| | a-2-2 | | parts by weight | 17 | 17 | 17 | 17 | 17 |
| | a-2-3 | | parts by weight | | | | | |

TABLE 9-continued

| | | | | | | | | |
|---|---|---|---|---|---|---|---|---|
| (B) ingredient | b-1 | | parts by weight | | | | | |
| | b-2 | | parts by weight | | | | | |
| | b-3 | | parts by weight | | | | | |
| (B') ingredient | b'-1 | | parts by weight | 0.5 | 0.5 | 0.5 | | |
| | b'-2 | | parts by weight | | | | 0.5 | |
| | b'-3 | | parts by weight | | | | | 0.5 |
| (E) ingredient | e-2 | | parts by weight | | 130 | 67 | 67 | 67 |
| | e-3 | | parts by weight | | | | | |
| (F) ingredient | f-1 | | parts by weight | | | | | |
| Flowability | Flow length | | mm | 200 | 84 | 91 | 92 | 102 |
| Heat resistance | DTUL | ISO | ° C. | 60 | 215 | 209 | 209 | 209 |
| Impact resistance | Notched Charpy | ISO | kJ/m2 | 5 | 12 | 11 | 11 | 12 |
| Bending properties | Bending | ISO | MPa | 90 | 224 | 244 | 245 | 244 |
| | Bending | ISO | GPa | 2.5 | 12.7 | 12.3 | 12.4 | 12.3 |
| Tensile properties | Tensile | ISO | MPa | 55 | 172 | 165 | 166 | 165 |
| | Break | ISO | % | 30 | 1 | 2 | 2 | 2 |
| Low warping property | Warping | | mm | 0.49 | 0.36 | 0.35 | 0.34 | 0.35 |

(A) Thermoplastic resins
a-1-1: Polybutylene terephthalate (melting point 223° C., "Toraycon" 1100S produced by Toray Industries, Inc.)
a-1-2: Polypropylene terephthalate (melting point 228° C., "Corterra" CP509211 produced by Shell Chemicals)
a-1-3: Polyethylene terephthalate (melting point 260° C., J155 produced by Mitsui Chemicals, Ltd.)
a-1-4: Polycarbonate ("Toughlon" A1900 produced by Idemitsu Kosan Co., Ltd.)
a-2-1: ABS resin ("Toyolac" T-100 produced by Toray Industries, Inc.)
a-2-2: Acrylonitrile/styrene resin (Acrylonitrile/Styrene = 25/75 produced by Toray Industries, Inc.)
a-2-3: Styrene/butadiene resin ("Epofriend" AT501 produced by Daicel Chemical Industries, Ltd.)
(B) Polyfunctional compounds having specific terminal structures and three or more functional groups
b-1: Polyoxyethylene diglycerol (molecular weight 410, 1.5 alkylene oxide units per one functional group, SC-E450 produced by Sakamoto Yakuhin Kogyo Co., Ltd.)
b-2: Oxyethylene trimethylolpropane (molecular weight 266, 1 alkylene oxide unit per one functional group, TMP-30U produced by Nippon Nyukazai Co., Ltd.)
b-3: Polyoxyethylene pentaerythritol (molecular weight 400, 1.5 alkylene oxide units per one functional group, PNT-60U produced by Nippon Nyukazai Co., Ltd.)
(B') Polyfunctional compounds other than (B)
b'-1: 1,6-hexanediol (Ardrich)
b'-2: 4,4'-dihydroxybiphenyl (Honshu Chemical Industry Co., Ltd.)
b'-3: Glycerol (molecular weight 92, 0 alkylene oxide unit per one functional group, Tokyo Chemical Industry Co., Ltd.)
(E) Inorganic filler
e-2: Chopped strand type glass fibers (fiber diameter 10 μm, T120H produced by Nippon Electric Glass Co., Ltd.)
e-3:
(F) Impact strength modifiers
f-1: Ethylene/ethylacrylate copolymer ("Evaflex" EEA A-709 produced by Du Pont-Mitsui Polychemicals Co., Ltd.)

From the results of Tables 7 to 9, the following are evident.

It can be seen that in the case where the added amount of (A-2) an amorphous resin is more than 50 wt %, the heat resistance of the resin composition tends to decline and that in the case where the amount is less than 2 wt %, the low warping property tends to decline.

In the comparison between Working examples 57 and 60 to 64 and Comparative Example 30, in the comparison between Working Example 67 and Comparative Example 31, in the comparison between Working Example 68 and Comparative Example 32, and in the comparison between Working Example 69 and Comparative Example 33, it can be seen that in the case where (B) a polyfunctional compound having specific terminal structures and three or more functional groups is added, the flowability of the resin composition is greatly enhanced.

In the comparison between Working Examples 57, 65 and 66 and Comparative Examples 36 and 37, in the case where (B) a polyfunctional compound having specific terminal structures and three or more functional groups is contained, the flowability enhancing effect is large.

In the comparison between Working Examples 57 and 71 to 73 and Comparative Examples 34 and 35, it can be seen that in the case where the added amount of an inorganic filler is less than 2 parts by weight, the effect of reinforcing the resin composition is small and that in the case where the amount is more than 120 parts by weight, the flowability declines.

Working Examples 77 to 94 and Comparative Examples 39 to 47

At each of the mixing ratios shown in Table 10 to 12, (A) thermoplastic resins, (B) a polyfunctional compound having specific terminal structures and three or more functional groups and other ingredients were mixed at a time, and (E) an inorganic filler was supplied from a side feeder of a twin-screw extruder. The mixture was melt-kneaded using the twin-screw extruder of L/D=45 at a cylinder temperature of 250° C. and at a rotation speed of 200 rpm, to obtain the corresponding resin composition as pellets.

The obtained resin composition was injection-molded using Injection Molding Machine SG75H-MN produced by Sumitomo Heavy Industries, Ltd. at a cylinder temperature of 250° C. and a mold temperature of 80° C., to obtain molded articles for various evaluations. The molded articles for various evaluations were used for the abovementioned evaluations. The evaluation results are shown in tables 10 to 12. Tables 10 and 11 show the results of the working examples, while Table 12 shows the results of the comparative examples.

TABLE 10

| | | | Working Example | | | | | | | | | |
|---|---|---|---|---|---|---|---|---|---|---|---|---|
| | | | 77 | 78 | 79 | 80 | 81 | 82 | 83 | 84 | 85 | 86 |
| (A-1) ingredient | a-1-1 | parts by weight | 80 | 80 | 80 | 80 | 80 | 80 | 90 | 70 | 55 | 80 |
| | a-1-4 | parts by weight | 20 | 20 | 20 | 20 | 20 | 20 | 10 | 30 | 45 | 20 |

TABLE 10-continued

|  |  |  |  | Working Example | | | | | | | | | |
|---|---|---|---|---|---|---|---|---|---|---|---|---|---|
|  |  |  |  | 77 | 78 | 79 | 80 | 81 | 82 | 83 | 84 | 85 | 86 |
| (A-2) ingredient | a-2-2 |  | parts by weight |  |  |  |  |  |  |  |  |  |  |
|  | a-2-3 |  | parts by weight |  |  |  | 5 | 50 | 90 | 5 | 5 | 5 | 5 |
|  | a-2-4 |  | parts by weight |  |  |  |  |  |  |  |  |  |  |
| (B) ingredient | b-1 |  | parts by weight |  |  |  |  |  |  |  |  |  |  |
|  | b-2 |  | parts by weight |  |  |  |  |  |  |  |  |  |  |
|  | b-3 |  | parts by weight | 0.05 | 0.05 | 0.05 | 0.05 | 0.05 | 0.05 | 0.05 | 0.05 | 0.05 | 0.02 |
| (B') ingredient | b'-1 |  | parts by weight |  |  |  |  |  |  |  |  |  |  |
|  | b'-2 |  | parts by weight |  |  |  |  |  |  |  |  |  |  |
| (E) ingredient | e-4 |  | parts by weight | 20 | 40 | 45 | 45 | 65 | 85 | 45 | 45 | 45 | 45 |
| (F) ingredient | f-1 |  | parts by weight |  |  |  | 5 |  |  |  |  |  |  |
| Flowability | Flow length |  | mm | 145 | 137 | 137 | 133 | 120 | 108 | 142 | 123 | 106 | 115 |
| Impact resistance | Notched Charpy impact | ISO | kJ/m2 | 6 | 12 | 12 | 12 | 14 | 16 | 12 | 14 | 15 | 12 |
| Bending properties | Bending strength | ISO | MPa | 174 | 202 | 205 | 205 | 187 | 189 | 195 | 193 | 189 | 205 |
|  | Bending modulus | ISO | GPa | 6.6 | 8.3 | 8.8 | 8.9 | 8.0 | 7.9 | 7.8 | 7.5 | 8.3 | 8.8 |
| Tensile properties | Tensile strength | ISO | MPa | 101 | 129 | 133 | 135 | 119 | 120 | 125 | 121 | 120 | 135 |
| Low warping property | Warping distance |  | mm | 0 | 0 | 0 | 0 | 0 | 0 | 0 | 0 | 0 | 0 |
| Transmittance | 2 mmt |  | % | 21 | 22 | 20 | 22 | 20 | 19 | 20 | 24 | 26 | 22 |
| Welding acceptability | 2 mmt |  | — | Acceptable | Acceptable | Acceptable | Acceptable | Acceptable | Acceptable | Acceptable | Acceptable | Acceptable | Acceptable |
| Welding conditions | Output/speed |  | W/mm/s | (23/4) | (23/4) | (25/4) | (23/4) | (25/4) | (25/4) | (25/4) | (23/4) | (20/4) | (23/4) |
| Welding strength |  |  | MPa | 38 | 39 | 38 | 40 | 37 | 36 | 36 | 37 | 39 | 40 |

(A) Thermoplastic resins
a-1-1: Polybutylene terephthalate (melting point 223° C.
a-1-2: Polypropylene terephthalate (melting point 228° C., "Corterra" CP509211 produced by Shell Chemicals)
a-1-3: Polyethylene terephthalate (melting point 260° C., J155 produced by Mitsui Chemicals, Ltd.)
a-1-4: Polycarbonate ("Toughlon" A1900 produced by Idemitsu Kosan Co., Ltd.)
a-2-2: Acrylonitrile/styrene resin (Acrylonitrile/Styrene = 25/75 produced by Toray Industries, Inc.)
a-2-3: Styrene/butadiene resin ("Epofriend" AT501 produced by Daicel Chemical Industries, Ltd.)
a-2-4: Polycyclohexanedimethylene terephthalate ("Easter" DN003 produced by Eastman Chemical)
(B) Polyfunctional compounds having specific terminal structures and three or more functional groups
b-1: Polyoxyethylene diglycerol (molecular weight 410, 1.5 alkylene oxide units per one functional group, SC-E450 produced by Sakamoto Yakuhin Kogyo Co., Ltd.)
b-2: Polyoxyethylene trimethylolpropane (molecular weight 266, 1 alkylene oxide unit per one functional group, TMP-30U produced by Nippon Nyukazai Co., Ltd.)
b-3: Polyoxyethylene pentaerythritol (molecular weight 400, 1.5 alkylene oxide units per one functional group, PNT-60U produced by Nippon Nyukazai Co., Ltd.)
(B') Polyfunctional compounds other than (B)
b'-1: 1,6-hexanediol (Ardrich)
b'-2: 4,4'-dihydroxybiphenyl (Honshu Chemical Industry Co., Ltd.)
(E) Inorganic filler
e-4: Chopped strand type glass fibers (fiber diameter 13 μm, 3PE949 produced by Nitto Boseki Co., Ltd.)
(F) Impact strength modifiers
f-1: Ethylene/ethyl acrylate copolymer ("Evaflex" EEA A-709 produced by Du Pont-Mitsui Polychemicals Co., Ltd.)

TABLE 11

|  |  |  | Working Example | | | | | | | |
|---|---|---|---|---|---|---|---|---|---|---|
|  |  |  | 87 | 88 | 89 | 90 | 91 | 92 | 93 | 94 |
| (A-1) ingredient | a-1-1 | parts by weight | 80 | 80 | 80 | 80 | 80 | 80 | 80 | 70 |
|  | a-1-4 | parts by weight | 20 | 20 | 20 | 20 | 20 |  |  |  |
| (A-2) ingredient | a-2-2 | parts by weight |  |  |  |  |  | 20 |  |  |
|  | a-2-3 | parts by weight | 5 | 5 | 5 | 5 | 5 | 5 | 5 | 5 |
|  | a-2-4 | parts by weight |  |  |  |  |  |  | 20 | 30 |
| (B) ingredient | b-1 | parts by weight |  |  |  | 0.5 |  |  |  |  |
|  | b-2 | parts by weight |  |  |  |  | 0.5 |  |  |  |
|  | b-3 | parts by weight | 1 | 3 | 4.5 |  |  | 0.5 | 0.5 | 0.5 |
| (B') ingredient | b'-1 | parts by weight |  |  |  |  |  |  |  |  |
|  | b'-2 | parts by weight |  |  |  |  |  |  |  |  |
| (E) ingredient | e-4 | parts by weight | 45 | 45 | 45 | 45 | 45 | 45 | 45 | 45 |

TABLE 11-continued

|  |  |  | | Working Example | | | | | | | |
|---|---|---|---|---|---|---|---|---|---|---|---|
|  |  |  | | 87 | 88 | 89 | 90 | 91 | 92 | 93 | 94 |
| (F) ingredient | f-1 | | parts by weight | | | | | | | | |
| Flowability | Flow length | | mm | 156 | 178 | 200 | 131 | 129 | 132 | 134 | 128 |
| Impact resistance | Notched Charpy impact | ISO | kJ/m2 | 12 | 11 | 10 | 12 | 12 | 12 | 12 | 12 |
| Bending properties | Bending strength | ISO | MPa | 206 | 204 | 205 | 204 | 205 | 205 | 207 | 208 |
|  | Bending modulus | ISO | GPa | 8.9 | 8.8 | 8.8 | 8.9 | 8.9 | 8.8 | 8.9 | 8.8 |
| Tensile properties | Tensile strength | ISO | MPa | 134 | 133 | 132 | 135 | 132 | 134 | 136 | 135 |
| Low warping property | Warping distance | | mm | 0 | 0 | 0 | 0 | 0 | 0 | 0 | 0 |
| Transmittance | 2 mmt | | % | 22 | 22 | 22 | 22 | 22 | 20 | 22 | 27 |
| Welding acceptability | 2 mmt | | — | Acceptable | Acceptable | Acceptable | Acceptable | Acceptable | Acceptable | Acceptable | Acceptable |
| Welding conditions | Output/speed | | W/mm/s | (23/4) | (23/4) | (23/4) | (23/4) | (23/4) | (25/4) | (23/4) | (20/4) |
| Welding strength | | | MPa | 40 | 40 | 40 | 40 | 40 | 39 | 40 | 40 |

(A) Thermoplastic resins
a-1-1: Polybutylene terephthalate (melting point 223° C., "Toraycon" 1100S produced by Toray Industries, Inc.)
a-1-2: Polypropylene terephthalate (melting point 228° C., "Corterra" CP509211 produced by Shell Chemicals)
a-1-3: Polyethylene terephthalate (melting point 260° C., J155 produced by Mitsui Chemicals, Ltd.)
a-1-4: Polycarbonate ("Toughlon" A1900 produced by Idemitsu Kosan Co., Ltd.)
a-2-2: Acrylonitrile/styrene resin (Acrylonitrile/styrene = 25/75 produced by Toray Industries, Inc.)
a-2-3: Styrene/butadiene resin ("Epofriend" AT501 produced by Daicel Chemical Industries, Ltd.)
a-2-4: Polycyclohexanedimethylene terephthalate ("Easter" DN003 produced by Eastman Chemical)
(B) Polyfunctional compounds having specific terminal structures and three or more functional groups
b-1: Polyoxyethylene diglycerol (molecular weight 410, 1.5 alkylene oxide units per one functional group, SC-E450 produced by Sakamoto Yakuhin Kogyo Co., Ltd.)
b-2: Polyoxyethylene trimethylolpropane (molecular weight 266, 1 alkylene oxide unit per one functional group, TMP-30U produced by Nippon Nyukazai Co., Ltd.)
b-3: Polyoxyethylene pentaerythritol (molecular weight 400, 1.5 alkylene oxide units per one functional group, PNT-60U produced by Nippon Nyukazai Co., Ltd.)
(B') Polyfunctional compounds other than (B)
b'-1: 1,6-hexanediol (Ardrich)
b'-2: 4,4'-dihydroxybiphenyl (Honshu Chemical Industry Co., Ltd.)
(E) Inorganic filler
e-4: Chopped strand type glass fibers (fiber diameter 13 μm, 3PE949 produced by Nitto Boseki Co., Ltd.)
(F) Impact strength modifiers
f-1: Ethylene/ethyl acrylate copolymer ("Evaflex" EEA A-709 produced by Du Pont-Mitsui Polychemicals Co., Ltd.)

TABLE 12

|  |  |  | | Comparative Example | | | | | | | | |
|---|---|---|---|---|---|---|---|---|---|---|---|---|
|  |  |  | | 39 | 40 | 41 | 42 | 43 | 44 | 45 | 46 | 47 |
| (A-1) ingredient | a-1-1 | | parts by weight | 80 | 100 | 45 | 80 | 80 | 80 | 80 | 80 | 80 |
|  | a-1-4 | | parts by weight | 20 | | 55 | 20 | | | 20 | 20 | 20 |
| (A-2) ingredient | a-2-2 | | parts by weight | | | | | 20 | | | | |
|  | a-2-3 | | parts by weight | 5 | 5 | 5 | 5 | 5 | 5 | 110 | 5 | 5 |
|  | a-2-4 | | parts by weight | | | | | | 20 | | | |
| (B) ingredient | b-1 | | parts by weight | | | | | | | | | |
|  | b-2 | | parts by weight | | | | | | | | | |
|  | b-3 | | parts by weight | | | | | | | | | |
| (B') ingredient | b'-1 | | parts by weight | 0.5 | 0.5 | 0.5 | | | | 0.5 | 0.5 | |
|  | b'-2 | | parts by weight | | | | | | | | | 0.5 |
| (E) ingredient | e-4 | | parts by weight | | 45 | 45 | 45 | 45 | 45 | 130 | 45 | 45 |
| (F) ingredient | f-1 | | parts by weight | | | | | | | | | |
| Flowability | Flow length | | mm | 145 | 101 | 91 | 93 | 98 | 97 | 70 | 99 | 98 |
| Impact resistance | Notched Charpy impact | ISO | kJ/m2 | 4 | 11 | 14 | 12 | 12 | 12 | 17 | 12 | 12 |
| Bending properties | Bending strength | ISO | MPa | 88 | 213 | 217 | 205 | 203 | 207 | 181 | 207 | 208 |
|  | Bending modulus | ISO | GPa | 2.4 | 8.9 | 8.6 | 8.8 | 8.7 | 8.8 | 7.5 | 8.6 | 8.6 |
| Tensile properties | Tensile strength | ISO | MPa | 54 | 134 | 135 | 132 | 133 | 133 | 118 | 135 | 133 |
| Low warping property | Warping distance | | mm | 1 | 0 | 0 | 0 | 0 | 0 | 0 | 0 | 0 |
| Transmittance | 2 mmt | | % | 23 | 11 | 38 | 22 | 20 | 22 | 14 | 22 | 22 |
| Welding acceptability | 2 mmt | | — | Acceptable | Unacceptable | Acceptable | Acceptable | Acceptable | Acceptable | Unacceptable | Acceptable | Acceptable |

TABLE 12-continued

|  |  |  | Comparative Example | | | | | | | | |
|---|---|---|---|---|---|---|---|---|---|---|---|
|  |  |  | 39 | 40 | 41 | 42 | 43 | 44 | 45 | 46 | 47 |
| Welding conditions | Output/speed | W/mm/s | (23/4) | — | (18/6) | (23/4) | (25/4) | (23/4) | — | (23/4) | (23/4) |
| Welding strength |  | MPa | 39 | — | 40 | 38 | 39 | 39 | — | 39 | 39 |

(A) Thermoplastic resins
a-1-1: Polybutylene terephthalate (melting point 223° C., "Toraycon" 1100S produced by Toray Industries, Inc.)
a-1-2: Polypropylene terephthalate (melting point 228° C., "Corterra" CP509211 produced by Shell Chemicals)
a-1-3: Polyethylene terephthalate (melting point 260° C., J155 produced by Mitsui Chemicals, Ltd.)
a-1-4: Polycarbonate ("Toughlon" A1900 produced by Hemitsu Kosan Co., Ltd.)
a-2-2: Acrylonitrile/styrene resin (Acrylonitrile/Styrene = 25/75 produced by Toray Industries, Inc.)
a-2-3: Styrene/butadiene resin ("Epofriend" AT501 produced by Daicel Chemical Industries, Ltd.)
a-2-4: Polycyclohexanedimethylene terephthalate ("Easter" DN003 produced by Eastman Chemical)
(B) Polyfunctional compounds having specific terminal structures and three or more functional groups
b-1: Polyoxyethylene diglycerol (molecular weight 410, 1.5 alkylene oxide units per one functional group, SC-E450 produced by Sakamoto Yakuhin Kogyo Co., Ltd.)
b-2: Polyoxyethylene trimethylolpropane (molecular weight 266, 1 alkylene oxide unit per one functional group, TMP-30U produced by Nippon Nyukazai Co., Ltd.)
b-3: Polyoxyethylene pentaerythritol (molecular weight 400, 1.5 alkylene oxide units per one functional group, PNT-60U produced by Nippon Nyukazai Co., Ltd.)
(B') Polyfunctional compounds other than (B)
b'-1: 1,6-hexanediol (Ardrich)
b'-2: 4,4'-dihydroxybiphenyl (Honshu Chemical Industry Co., Ltd.)
(E) Inorganic filler
e-4: Chopped strand type glass fibers (fiber diameter 13 μm, 3PE949 produced by Nitto Boseki Co., Ltd.)
(F) Impact strength modifiers
f-1: Ethylene/ethyl acrylate copolymer ("Evaflex" EEA A-709 produced by Du Pont-Mitsui Polychemicals Co., Ltd.)

From the results of Tables 10 to 12, the following are evident.

In the comparison between Working Examples 77 to 82 and Comparative Examples 39 and 45, it can be seen that in the case where no (E) inorganic filler (such as glass fibers) is contained, there is an effect of enhancing the flowability, though the warping property and mechanical strength tend to decline. On the other hand, it is not preferred that a large amount of an inorganic filler is contained for such reasons that the flowability at the time of molding greatly declines and that the laser transmittance may also decline.

In the comparison between Working Examples 80, 83 to 85 and 92 to 94 and Comparative Examples 40 and 41, it can be seen that in the case where no (A-2) amorphous resin is added, a laser beam sufficient for laser welding cannot be transmitted through the resin composition, while the warping is large. Further, it can be seen that in the case where the added amount of the (A-2) amorphous resin is too large, a sufficient flowability may not be obtained even if the (B) polyfunctional compound having specific terminal structures and three or more functional groups is added, though there is no problem with laser welding.

In the comparison between Working Examples 80 and 86 to 91 and Comparative Example 42, in the comparison between Working Example 92 and Comparative Example 43 and in the comparison between Working Examples 93 and 94 and Comparative Example 44, it can be seen that in the case where the (B) polyfunctional compound having specific terminal structures and three or more functional groups is added, the flowability of the resin composition is greatly enhanced in response to the added amount of the (B) ingredient.

In the comparison between Working Examples 80, 90 and 91 and Comparative Examples 46 and 47, in the case where the (B) polyfunctional compound having specific terminal structures and three or more functional groups is contained, the flowability enhancing effect is large.

In the comparison between Working Examples 78 and 92 to 94 and Comparative Examples 45 and 46, it can be seen that in the case where the added amount of the inorganic filler is less than 2 parts by weight, the effect of reinforcing the resin composition is small and that in the case where the amount is more than 120 parts by weight, the flowability declines.

INDUSTRIAL APPLICABILITY

The resin composition and the molded article can be used as electric/electronic apparatus parts, automobile parts, machine parts, etc., since they are excellent in flowability and mechanical properties and also excellent in low warping property, laser transmittance and laser weldability.

The invention claimed is:

1. A thermoplastic resin composition consisting of 100 parts by weight of at least one thermoplastic resin (A) selected from the group consisting of polyester resin, polyamide resin, polyacetal resin and polycarbonate resin, and 0.1 to 1 parts by weight of (B) a polyfunctional compound having three or more functional groups in which at least one terminal structure having the functional groups comprises a structure represented by formula (1):

where R is an alkylene group with 1-15 carbon atoms; n is an integer of 1 to 10; and X is at least one functional group selected from the group consisting of hydroxyl group, aldehyde group, carboxyl group, sulfo group, amino group, isocyanate group, carbodiimide group, oxazoline group, oxazine group, amide group, silanol group and silyl ether group.

2. The thermoplastic resin composition according to claim 1, wherein the (A) thermoplastic resin is one or more selected from the group consisting of a polyester resin and polycarbonate resin.

3. A molded article obtained by molding the thermoplastic resin composition as set forth in claim 1.

4. The thermoplastic resin composition according to claim 1, wherein X is at least one functional group selected from the group consisting of hydroxyl group, aldehyde group, carboxyl group, sulfo group, isocyanate group, carbodiimide group, oxazoline group, oxazine group, amide group, silanol group and silyl ether group.

5. A thermoplastic resin composition consisting of 100 parts by weight of at least one thermoplastic resin (A) selected from the group consisting of polyester resin, polyamide resin, polyacetal resin and polycarbonate resin, 0.1 to 1 parts by weight of (B) a polyfunctional compound having three or more functional groups in which at least one terminal structure having the functional groups comprises a structure represented by formula (1):

$$-(O-R)_n-X \quad (1)$$

where R is an alkylene group with 1-15 carbon atoms; n is an integer of 1 to 10; and X is at least one functional group selected from the group consisting of hydroxyl group, aldehyde group, carboxyl group, sulfo group, amino group, isocyanate group, carbodiimide group, oxazoline group, oxazine group, amide group, silanol group and silyl ether group, and,
one or more of a terminal blocking agent, ester interchange catalyst, inorganic filler, and at least one impact strength modifier selected from the group consisting of natural rubber, polyester elastomers, polyethylene, polypropylene, impact strength modifying polystyrene, polybutadiene, ethylene/propylene copolymer, ethylene/vinyl acetate copolymer and acrylic core shell elastomers.

6. The thermoplastic resin composition according to claim 5, wherein the terminal blocking agent has less than three functional groups.

* * * * *